(12) United States Patent
Ahn et al.

(10) Patent No.: US 9,268,440 B2
(45) Date of Patent: Feb. 23, 2016

(54) HYBRID TOUCH PANEL, HYBRID TOUCH SCREEN APPARATUS, AND METHOD OF DRIVING THE HYBRID TOUCH PANEL

(71) Applicant: Samsung Electronics Co., Ltd., Suwon-Si, Gyeonggi-Do (KR)

(72) Inventors: Seung-eon Ahn, Hwaseong-si (KR); I-hun Song, Hwaseong-si (KR); Sang-hun Jeon, Seoul (KR); Young Kim, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 76 days.

(21) Appl. No.: 14/018,610

(22) Filed: Sep. 5, 2013

(65) Prior Publication Data

US 2014/0085267 A1    Mar. 27, 2014

(30) Foreign Application Priority Data

Sep. 27, 2012 (KR) .......................... 10-2012-0108264

(51) Int. Cl.
*G06F 3/042* (2006.01)
*G06F 3/041* (2006.01)
*G06F 3/044* (2006.01)

(52) U.S. Cl.
CPC .............. *G06F 3/0421* (2013.01); *G06F 3/042* (2013.01); *G06F 3/044* (2013.01); *G06F 3/0412* (2013.01)

(58) Field of Classification Search
None
See application file for complete search history.

(56) References Cited

U.S. PATENT DOCUMENTS

| 7,924,378 | B2 | 4/2011 | Chen et al. |
| 2011/0080390 | A1 | 4/2011 | Katoh et al. |
| 2011/0096035 | A1 | 4/2011 | Shen |
| 2011/0141060 | A1 | 6/2011 | Kim et al. |
| 2011/0221707 | A1 | 9/2011 | Oyobe et al. |
| 2011/0242044 | A1 | 10/2011 | Liu |
| 2011/0284722 | A1 | 11/2011 | Ahn et al. |
| 2012/0085999 | A1 | 4/2012 | Song et al. |
| 2012/0113058 | A1* | 5/2012 | Yamazaki ........... G06F 3/03545 345/175 |
| 2013/0027326 | A1 | 1/2013 | Kim et al. |
| 2013/0088460 | A1 | 4/2013 | Ahn et al. |

FOREIGN PATENT DOCUMENTS

| KR | 10-0942293 B1 | 2/2010 |
| KR | 10-1036499 B1 | 5/2011 |
| KR | 2011-0110027 A | 10/2011 |

* cited by examiner

*Primary Examiner* — Kenneth B Lee, Jr.
(74) *Attorney, Agent, or Firm* — Harness, Dickey & Pierce, P.L.C.

(57) ABSTRACT

A touch panel includes a sensing unit having a first sub sensing unit configured to output a first sensing current in response to a voltage of a first gate line and configured to reset in response to a voltage of a second gate line the first sensing current corresponding to a first touch type, and a second sub sensing unit configured to output a second sensing current in response to a voltage of a third gate line and configured to reset in response to a voltage of a fourth gate line, the second sensing current corresponding to a second touch type which is different than the first touch type, a display unit configured to generate an image voltage corresponding to image data to be displayed, in response to at least one of the voltages of the first to fourth gate lines and liquid crystal.

25 Claims, 29 Drawing Sheets

No touch

Touch

HYBRID TOUCH PANEL, HYBRID TOUCH SCREEN APPARATUS, AND METHOD OF DRIVING THE HYBRID TOUCH PANEL

CROSS-REFERENCE TO RELATED APPLICATION

This application claims the benefit of Korean Patent Application No. 10-2012-0108264, filed on Sep. 27, 2012, in the Korean Intellectual Property Office, the entire contents of which are incorporated herein in their entirety by reference.

BACKGROUND

1. Field

The example embodiments relates to a hybrid touch panel, a hybrid touch screen apparatus, and a method of driving the hybrid touch panel, and more particularly, to a hybrid touch screen apparatus having a structure adaptive to hybrid touch sensing and a method of adaptively driving the same.

2. Description of the Related Art

Touch panels that may be driven according to various methods, e.g., a pressure-type resistive overlay method, a contact-type electrostatic capacitive method, a surface acoustic wave (SAW) method, and a piezoelectric method, have been developed and used. Furthermore, touch panels that employ an optical sensing method and that may thus be operated at a long distance may also have been developed and used.

SUMMARY

Provided are a hybrid touch panel having a structure adaptive to hybrid touch sensing, a hybrid touch screen apparatus, and a method of adaptively driving the hybrid touch panel. Additional aspects will be set forth in part in the description which follows and, in part, will be apparent from the description, or may be learned by practice of the presented embodiments.

According to an aspect of some example embodiments, a touch panel includes a sensing unit a first sub sensing unit configured to output a first sensing current in response to a voltage of a first gate line and configured to reset in response to a voltage of a second gate line, the first sensing current corresponding to a first touch type, and a second sub sensing unit configured to output a second sensing current in response to a voltage of a third gate line and configured to reset in response to a voltage of a fourth gate line, the second sensing current corresponding to a second touch type which is different than the first touch type, and a display unit configured to generate an image voltage corresponding to image data to be displayed, in response to at least one of the voltages of the first to fourth gate lines.

According to another aspect of at least one example embodiment, a touch screen apparatus includes a touch panel including a first sub sensing unit configured to output a first sensing current and a second sub sensing unit configured to output a second sensing current. The first sensing current corresponds to a first touch type. The second sensing current corresponds to a second touch type. The second touch type is different than the first touch type. The second sub sensing unit includes an oxide transistor configured to output the second sensing current.

According to an aspect of some example embodiments, a method of controlling a touch panel, the method comprising controlling first and second sensing units such that one of the first and second sensing units is active. The first sensing unit is configured to sense a first touch type of the touch panel. The second sensing unit is configured to sense a second touch type of the touch panel. The first touch type is different than the second touch types.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
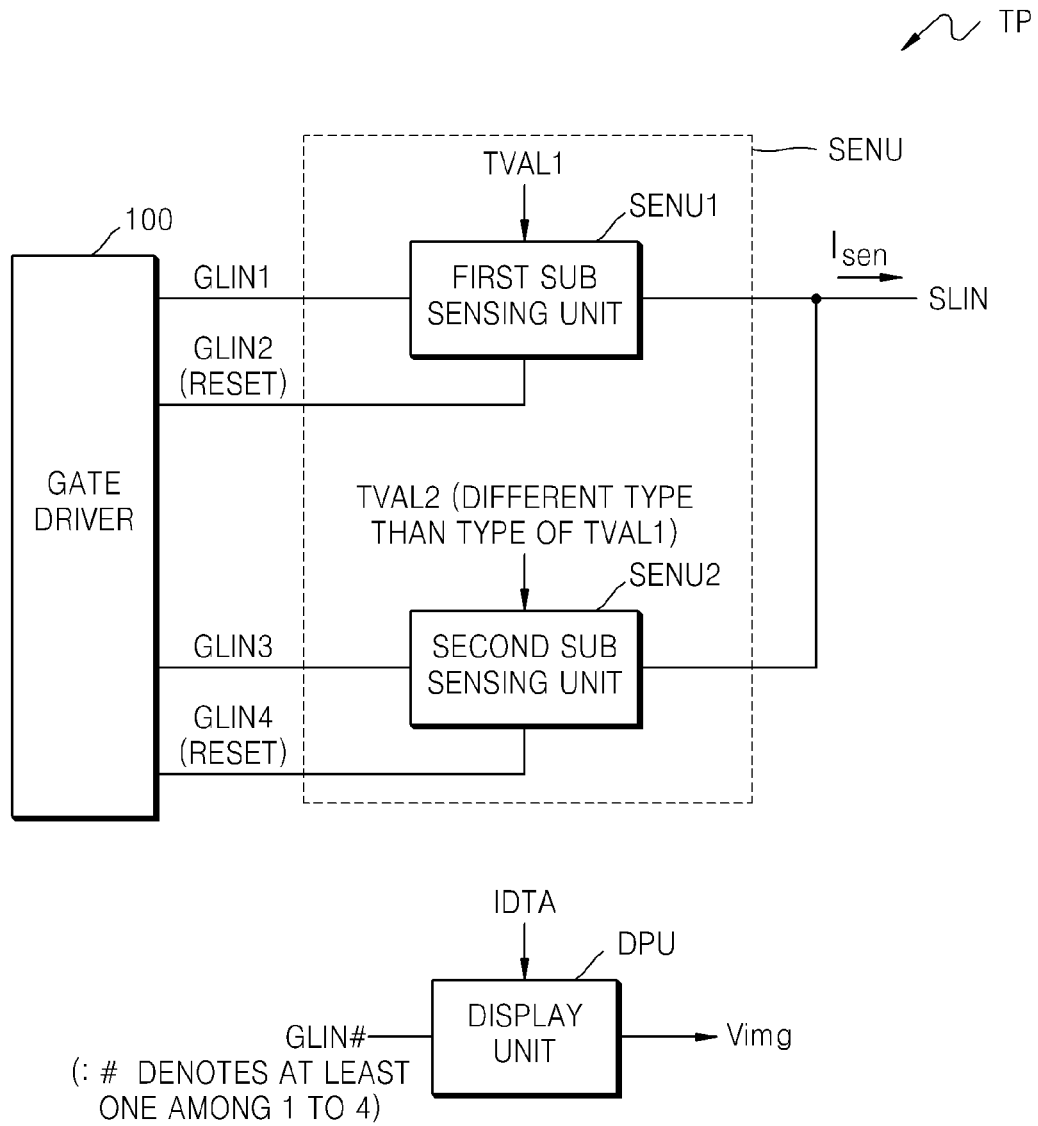
FIG. 1 illustrates a touch panel according to an example embodiment.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a diagram illustrating a touch panel TP according to an example embodiment. Referring to FIG. 1, the touch panel TP includes a sensing unit SENU and a display unit DPU. The sensing unit SENU includes a first sub sensing unit SENU1 and a second sub sensing unit SENU2. The first sub sensing unit SENU1 outputs sensing current $I_{sen}$ corresponding to a first touch variation TVAL1 via a sensing line SLIN (shown in FIG. 6), in response to activation of a first gate line GLIN1. The first sub sensing unit SENU1 is reset when the first gate line GLIN1 is deactivated and a second gate line GLIN2 is activated. The second sub sensing unit SENU2 outputs sensing current $I_{sen}$ corresponding to a second touch variation TVAL2 via the sensing line SLIN, in response to activation of a third gate line GLIN3. The second sub sensing unit SENU2 is reset when the third gate line GLIN3 is deactivated and a fourth gate line GLIN4 is activated.

In FIG. 1, the first gate line GLIN1 and the third gate line GLIN3 may be sensor gate lines activated during a sensing operation, and the second gate line GLIN2 and the fourth gate line GLIN4 may be display gate lines activated during a display operation. In other words, in the touch panel TP, the display gate lines may be used to reset the sensing unit SENU.

The type of the second touch variation TVAL2 is different from that of the first touch variation TVAL1. For example, the first touch variation TVAL1 may indicate whether the touch panel TP is physically touched, and the second touch variation TVAL2 may indicate whether the touch panel TP is optical touched, as will be described in detail below. Unless specified otherwise, it is hereinafter assumed that the first sub sensing unit SENU1 senses physical touch and the second sub sensing unit SENU2 senses optical touch.

Referring to FIG. 1, the display unit DPU generates an image voltage Vimg corresponding to image data IDTA that is to be displayed, in response to activation of a corresponding gate line among the first gate line GLIN1 to the fourth gate line GLIN4. The first gate line GLIN1 to the fourth gate line GLIN4 may be different types of gate lines, or some of the first gate line GLIN1 to the fourth gate line GLIN4 may be the same gate line. The first gate line GLIN1 to the fourth gate line GLIN4 may be disposed adjacent to or apart from one another, and may each include a plurality of lines, as will be described in detail below. A gate driver 100 generates signals across the first gate GLIN1 to the fourth gate GLIN4.

Figure 2A:
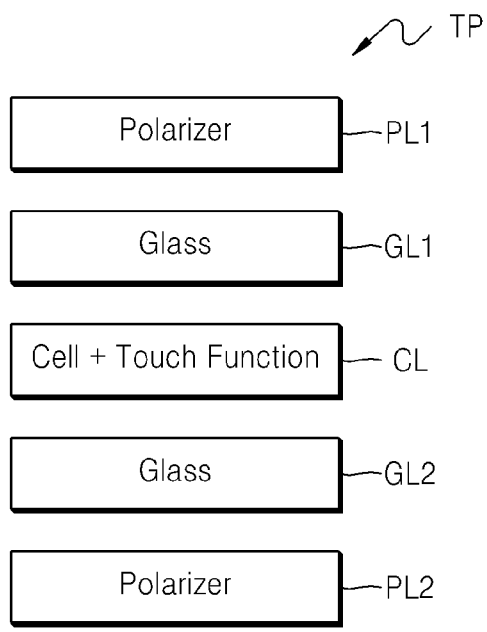
FIGS. 2A-2B are diagrams illustrating types of the touch panel of FIG. 1.
Figure 2B:
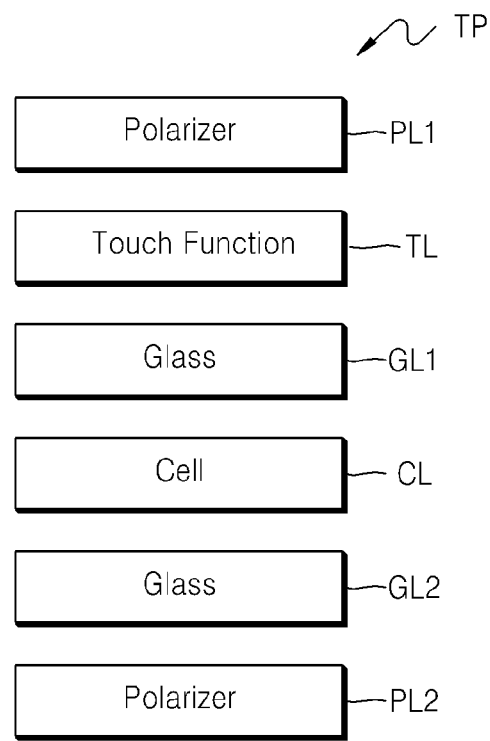

FIGS. 2A-2B are diagrams illustrating types of the touch panel TP of FIG. 1. Referring to FIGS. 1 and 2A, in a touch panel TP, the display unit DPU (cell) and the sensing unit SENU that senses touch (touch function) illustrated in FIG. 1 may be disposed on the same layer CL between glasses GL1 and GL2, between polarizers PL1 and PL2. Such a touch panel in which a pixel for displaying and a circuit for sensing are disposed on the same layer (array) may be referred to as an in-cell type. The touch panel TP which is an in-cell type as illustrated in FIG. 2A may be manufactured while reducing manufacture costs, simplifying a manufacture process, and reducing the thickness of a panel, compared to a touch panel TP of FIG. 2B in which a touch pad (sensing unit SENU) is disposed separately from display pixels (display unit DPU). The touch panel TP may be driven according to a plane line switching (PLS) mode that guarantees wide viewing angle, but example embodiments are not limited thereto and the touch panel TP may be embodied as an in-plane switching (IPS) panel or the like.

FIG. 2B illustrates a case where a touch pad TL that performs a touch function is disposed between an upper polarizer PL1 and an upper glass GL1. A panel as illustrated in FIG. 2B may be referred to as an on-cell type.

When a touch panel is an in-cell type in which a display unit and a sensing unit are disposed on the same layer, an aperture ratio may be reduced due to the sensing unit. To minimize a reduction in the aperture ratio, a first electrode and a second electrode may be arranged as illustrated in FIGS. 3A-3B.

Figure 3A:
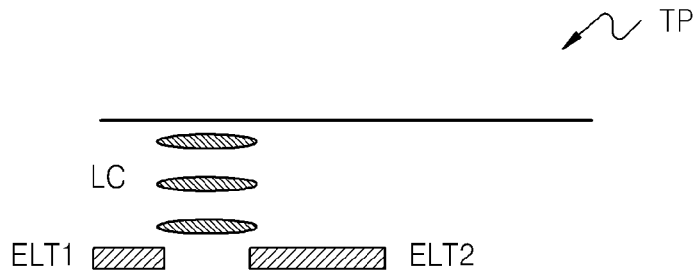
FIGS. 3A-3B are diagrams illustrating locations of a first electrode and a second electrode in the touch panel of FIG. 1, according to example embodiments.
Figure 3B:
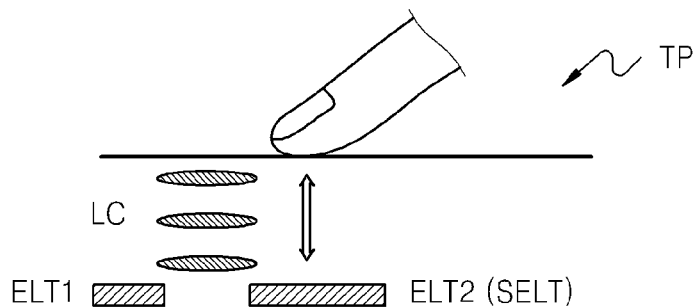

FIGS. 3A-3B are diagrams illustrating locations of a first electrode ELT 1 and a second electrode ELT2 in the touch panel TP of FIG. 1, according to example embodiments.

Referring to FIGS. 1 and 3A, in the touch panel TP, both a first electrode ELT1 and a second electrode ELT2 may be formed at a first side of a liquid crystal LC. The first electrode ELT1 may be a pixel electrode, and a second electrode ELT2 may be a common electrode.

As will be described below, each of pixels included in the display unit DPU may include a transistor that is turned on to apply an image voltage Vimg to the first electrode ELT1, in response to activation of a display gate line DGL. The image voltage Vimg is a voltage that corresponds to the image data IDTA to be displayed and that is applied to a source line connected to one terminal of the transistor. A common voltage (reference voltage) may be applied to the second electrode ELT2. A twisting degree of the liquid crystal LC varies according to the difference between voltages of the first electrode ELT1 and the second electrode ELT2, and the transmittance of backlight varies according to the twisting degree of the liquid crystal LC, thereby displaying the image data IDTA.

Figure 4A:
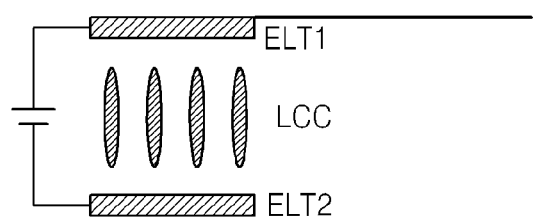
FIGS. 4A-4B illustrate examples of touch panels, in which a first electrode and a second electrode are disposed differently from those of the touch panel of FIGS. 3A-3B, according to example embodiments.
Figure 4B:
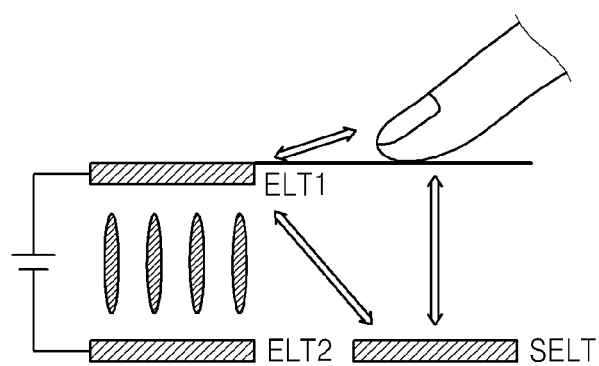

As illustrated in FIG. 3B, in the touch panel TP, the second electrode ELT2 may be used as a sensing electrode SELT that senses whether touch is made, as will be described in detail below. In FIGS. 3A and 3B, both the first electrode ELT1 and the second electrode ELT2 are formed at the first side of the liquid crystal LC, whereas in a touch panel of FIG. 4A, a first electrode ELT1 is disposed at a first side of a liquid crystal LC and a second electrode ELT2 is disposed at a second side of a liquid crystal LC. In this case, as illustrated in FIG. 4B, an aperture ratio may be reduced, since the area of a sensing electrode SELT should be increased due to an interference effect occurring among the first electrode ELT1, the second electrode ELT2, and the sensing electrode SELT.

The touch panel TP may have the first electrode ELT1 and the second electrode ELT2 in a structure as illustrated in FIGS. 3A and 3B, thereby preventing a reduction in the aperture ratio. A structure and operation of a sensing unit that performs sensing, included in a touch panel in which a first electrode ELT1 and a second electrode ELT2 are included in the structure as illustrated in FIGS. 3A and 3B and the second electrode ELT2 is used as a sensing electrode SELT that senses whether touch is made, will now be described.

Figure 5:
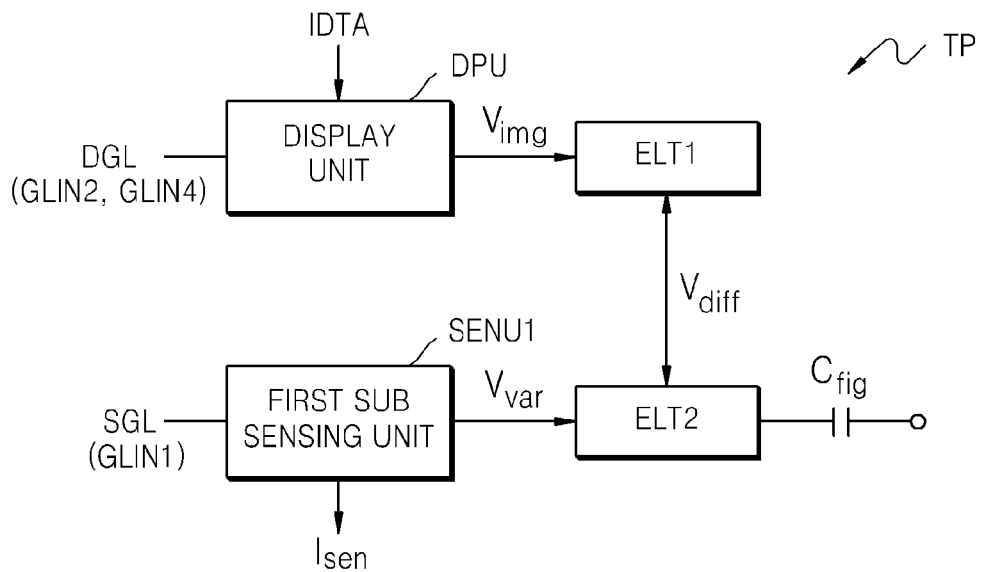
FIG. 5 is a block diagram illustrating some elements of the touch panel of FIG. 1, according to an example embodiment.

FIG. 5 is a block diagram illustrating some elements of the touch panel TP of FIG. 1, according to an example embodiment. Referring to FIGS. 1 and 5, the first sub sensing unit SENU1 according to an example embodiment, senses whether a finger capacitance Cfig occurs due to physical touching of the touch panel TP based on a voltage variation Vvar in a second electrode ELT2 in response to activation of a sensor gate line SGL. As described above, the second electrode ELT2 may be a common electrode.

The display unit DPU applies an image voltage Vimg to the first electrode ELT1, in response to the display gate line DGL. A liquid crystal may be driven according to a voltage difference Vdiff between the first electrode ELT1 and the second electrode ELT2. Electric charges corresponding to the voltage difference Vdiff between the first electrode ELT1 and the second electrode ELT2 are charged in a storage capacity of the display unit DPU, which is described in detail below. In FIG. 5, the display gate line DGL may be the same as the second gate line GLIN2 or the fourth gate line GLIN4 illustrated in FIG. 1.

As described above, the first sub sensing unit SENU1 senses whether a finger capacitance Cfig occurs due to physical touching of the touch panel TP, based on a voltage variation Vvar at the second electrode ELT2, in response to activation of the sensor gate line SGL. The finger capacitance Cfig is a parasitic capacitance formed due to a voltage difference between a finger as an electric capacitor and the second electrode ELT2, caused by physical touch.

The sensor gate line SGL of FIG. 5 may be the same as the first gate line GLIN1 of FIG. 1. The touch panel TP of FIG. 5 includes the second sub sensing unit SENU2, similar to the touch panel TP of FIG. 1. Thus, the touch panel TP of FIG. 5 may sense not only physical touch but also another touch, e.g., optical touch. However, for convenience of explanation, only the first sub sensing unit SENU1 that senses physical touch is illustrated in FIG. 5.

A value sensed by the first sub sensing unit SENU1 is output as sensing current $I_{sen}$ via the sensing line SLIN. A structure and operation of the first sub sensing unit SENU1 of FIG. 5 will now be described in more detail.

Figure 6:
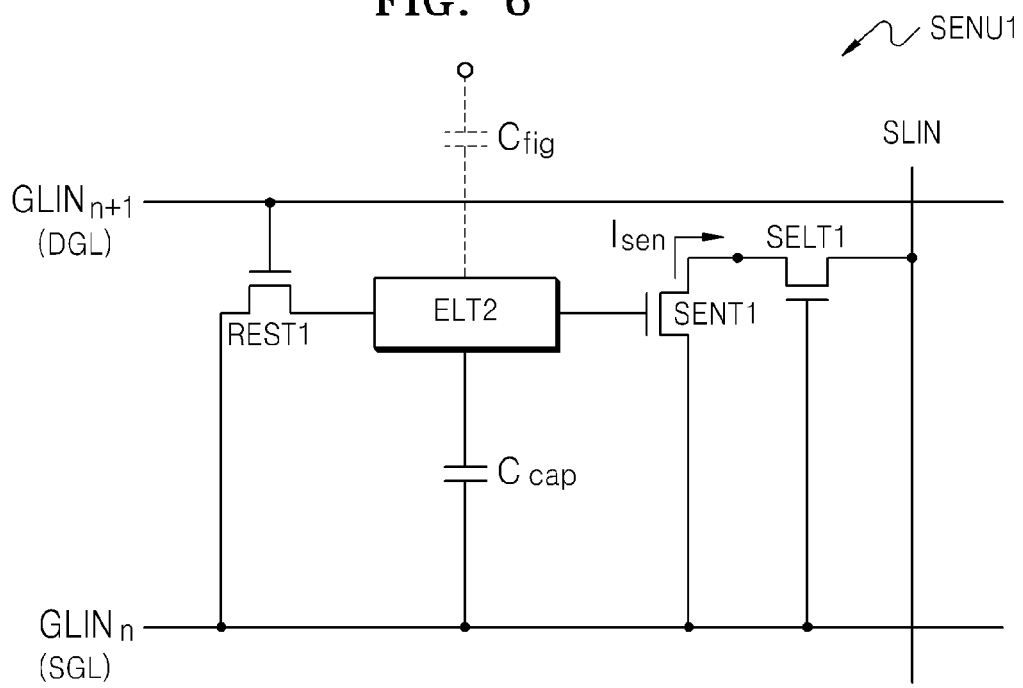
FIG. 6 is a circuit diagram of a circuit equivalent to a first sub sensing unit of FIG. 5.

FIG. 6 is a circuit diagram of a circuit equivalent to the first sub sensing unit SENU1 of FIG. 5. Referring to FIGS. 5 and 6, the first sub sensing unit SENU1 according to an example embodiment may include a first sensing transistor SENT1, a first selection transistor SELT1, and a first reset transistor REST1. A gate and one terminal of the first sensing transistor SENT1 are connected to the second electrode ELT2 and one terminal of the first selection transistor SELT1, respectively. A gate, one terminal, and the other terminal of the first selection transistor SELT1 are connected to a gate line GLIN$_n$, one terminal of the sensing transistor SENT1, and a sensing line SLIN, respectively. A gate, one terminal, and the other terminal of the first reset transistor REST1 are connected to a gate line GLIN$_{n+1}$, the second electrode ELT2, and the gate line GLIN$_n$, respectively.

As described above, the second electrode ELT2 may be a common electrode. The gate line GLIN$_n$ may be the same as the sensor gate line SGL of FIG. 5, and the gate line GLIN$_{n+1}$ may be the same as the display gate line DGL of FIG. 5. Thus, the first selection transistor SELT1 is gated in response to activation of the sensor gate line SGL, and supplies sensing current I$_{sen}$, which corresponds to a voltage variation Vvar at the second electrode ELT2, sensed by the first sensing transistor SENT1 to the sensing line SLIN.

The voltage variation Vvar at the second electrode ELT2 may be based on a ratio of a finger capacitance Cfig and a coupling capacitance Ccap between the second electrode ELT2 and the sensor gate line SGL. For example, if the finger capacitance Cfig is not formed, i.e., if touch is not made, then a voltage of the second electrode ELT2 may be equal to a voltage applied to the sensor gate line SGL. However, if the finger capacitance Cfig is formed, for example, if the finger capacitance Cfig and the coupling capacitance Ccap are the same, then the voltage of the second electrode ELT2 may be half the voltage applied to the sensor gate line SGL. When the first sensing transistor SENT1 is turned on, the first sensing transistor SENT1 may generate the sensing current I$_{sen}$ to correspond to the ratio of the finger capacitance Cfig and the coupling capacitance Ccap.

After touch is sensed in response to activation of the sensor gate line SGL as described above, the second electrode ELT2 is reset in response to deactivation of the sensor gate line SGL and activation of the display gate line DGL. For example, the first reset transistor REST1 may reset the second electrode ELT2 by a common voltage.

Referring to FIGS. 5 and 6, both the other terminal of the first sensing transistor SENT1 and the other terminal of the first reset transistor REST1 may be connected to the sensor gate line SGL. By sharing the other terminal of the first sensing transistor SENT1 with another transistor, a parasitic capacitance that may be generated due to a variation in the finger capacitance Cfig may be reduced.

Figure 7:
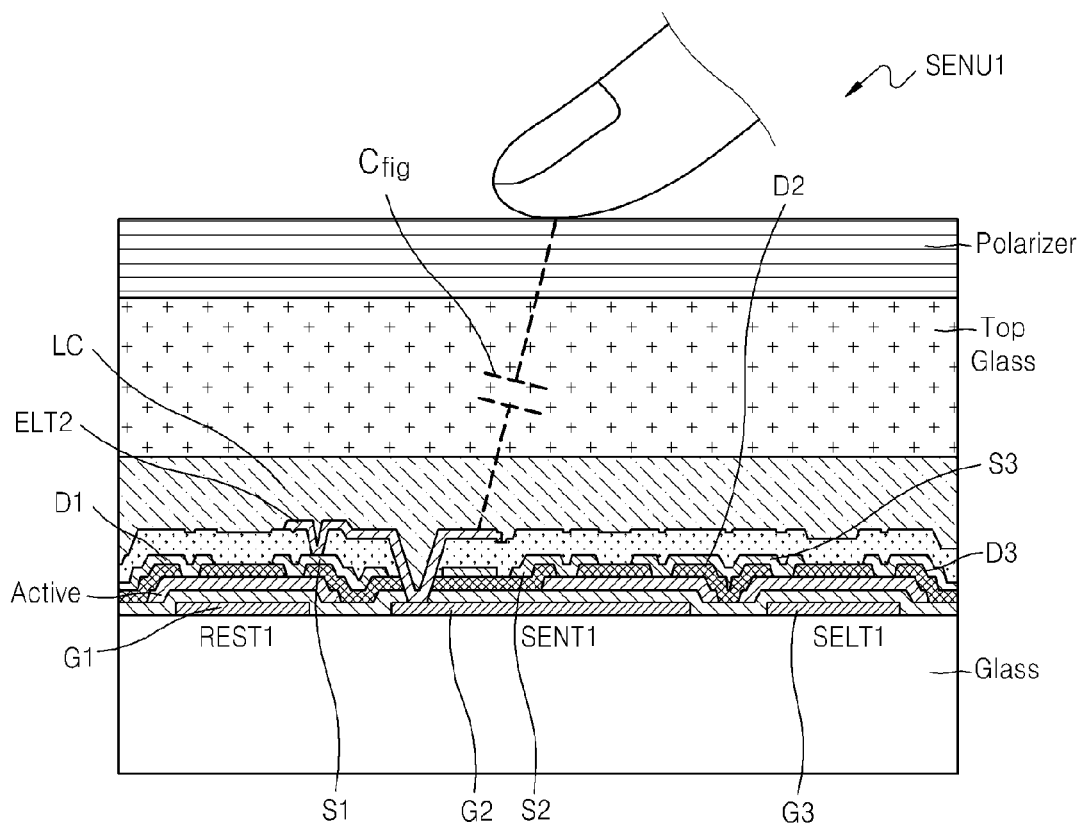
FIG. 7 is a cross-sectional view of a first sub sensing unit shown in FIG. 6.

FIG. 7 is a cross-sectional view of a sub-sensing unit SENU1, such as shown in FIG. 6. Referring to FIGS. 6 and 7, a gate G1 of a first reset transistor REST1, a gate G2 of a first sensing transistor SENT1, and a gate G3 of a first selection transistor SELT1, are formed on a glass substrate and active areas Active that are insulated from the gates G1, G2, and G3 via insulators are respectively formed on the insulators. The active areas Active may be electrically connected to source and drain electrodes S1 and D1, S2 and D2, and S3 and D3. One terminal S1 of the first reset transistor REST1 is connected to a second electrode ELT2. A gate G2 and one terminal D2 of the first sensing transistor SENT1 are connected to the second electrode ELT2 and one terminal S3 of the first selection transistor SELT1, respectively. The gate G1 and the other terminal D1 of the first reset transistor REST1, the other terminal S1 of the first sensing transistor SENT1, and the gate G3 and the other terminal D3 of the first selection transistor SELT1 may be connected to the gate line GLINn, the GLINn+1, or the sensing line SLIN of FIG. 6, via contacts (not shown).

As described above, a coupling capacitance Ccap is formed by the second electrode ELT2 and the source and drain electrodes S1 and D1, and whether touch occurs may be sensed according to whether a finger capacitance Cfig occurs.

Figure 8:
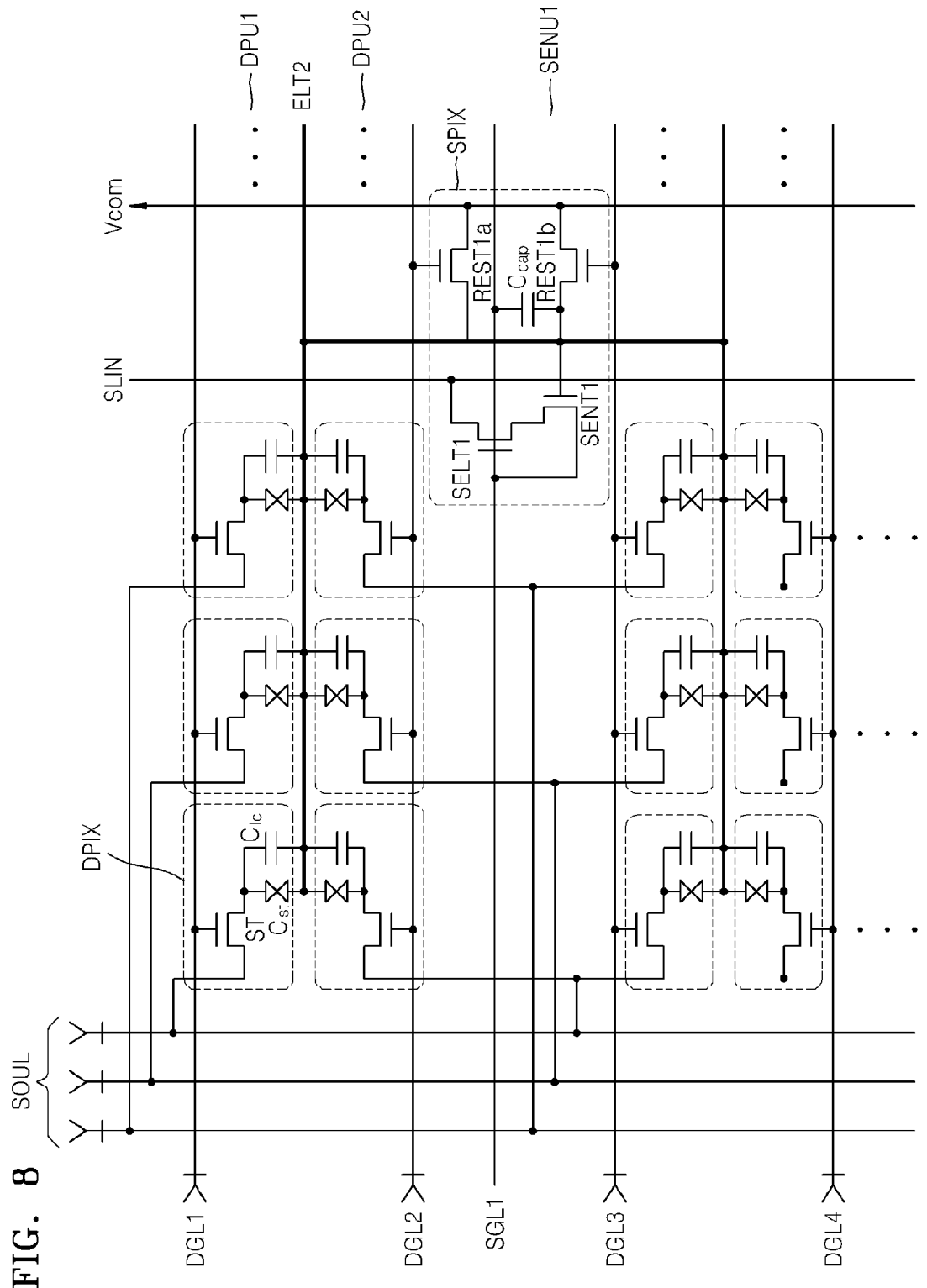
FIGS. 8 and 9 illustrate a structure and operation of the touch panel of FIG. 5, according to an example embodiment.
Figure 9:
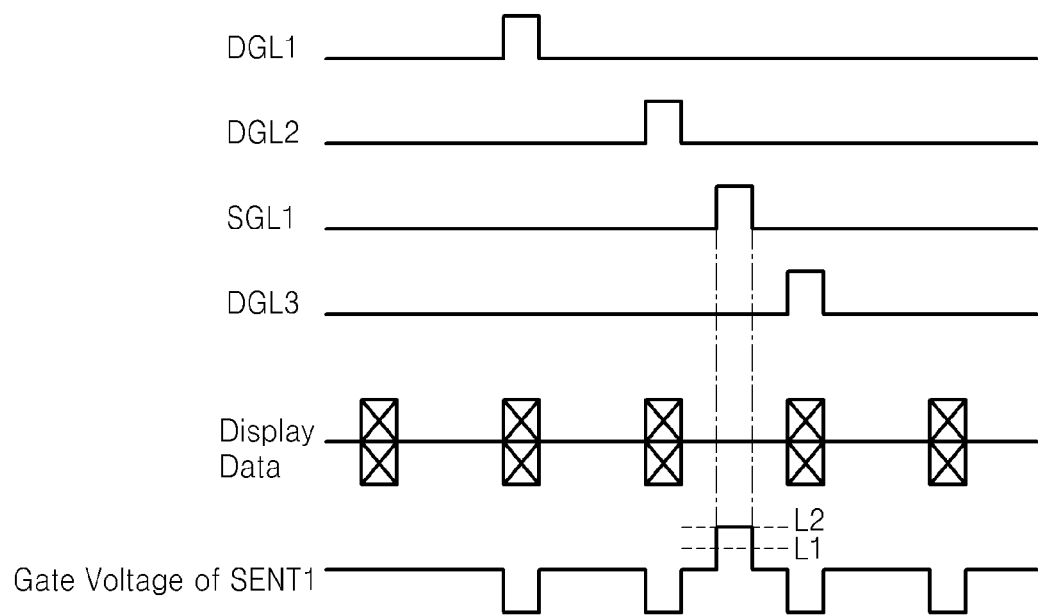

FIGS. 8 and 9 illustrate a structure and operation of the touch panel TP of FIG. 5, according to an example embodiment. Referring to FIGS. 5, 8, and 9, the first sub sensing unit SENU1 of the touch panel TP may be included in both of two display units DPU1 and DPU2 sharing the second electrode ELT2. Although FIG. 8 illustrates some display pixels DPIX of the display units DPU1 and DPU2, additional display pixels may be included in the display units DPU1 and DPU2.

As described above, the display unit DPU is activated by the display gate line DGL, and applies an image voltage Vimg corresponding to image data IDTA transmitted via source lines SOUL, to the first electrode ELT1. The source lines SOUL may include three lines, e.g., R, G, and B lines. Although not shown in FIG. 8, the first electrode ELT1 may be connected to a drain of a switching transistor ST of the display unit DPU. A voltage difference Vdiff between the first electrode ELT1 and the second electrode ELT2 changes a cell capacitance C$_{ic}$ to drive a liquid crystal to correspond to the image voltage Vimg. If the second electrode ELT2 is a common electrode, a common voltage Vcom is applied to the second electrode ELT2. A storage capacitor C$_{st}$ of the display unit DPU is charged to correspond to the image voltage Vimg.

A first display gate line DGL1 and a second display gate line DGL2 are sequentially activated, a first display unit DPU1 and a second display unit DPU2 sequentially drive the liquid crystal, and then, the first sensor gate line SGL1 is activated. The second display gate line DGL2 may be the same as the second gate line GLIN2 of FIG. 1.

When the sensor gate line SGL is activated, the display gate line DGL2 is deactivated and the first electrode ELT1 is thus floated. The liquid crystal may be maintained in a state driven by the second display unit DPU2 (a voltage of a storage capacitor Cst of the second display unit DPU2) until a subsequent display gate line (third display gate line DGL3) is activated.

When the first sensor gate line SGL1 is activated, a voltage variation Vvar at the second electrode ELT2 due to generation of a finger capacitance Cfig is sensed as sensing current I$_{sen}$ as described above. Although FIG. 8 illustrates some sensing pixels SPIX of the first sub sensing unit SENU1, additional sensing pixels may be included in the first sensing unit SENU1.

In FIG. 9, a gate voltage of the first sensing transistor SENT1 of the first sub sensing unit SENU1 may have a first level L1 when the finger capacitance Cfig is formed, and may have a second level L2 when the finger capacitance Cfig is not formed.

First reset transistors REST1$a$ and REST1$b$ of the first sub sensing unit SENU1 reset the second electrode ELT2 before and after a sensing operation of the first sub sensing unit SENU1 is performed. For example, the first reset transistors REST1$a$ and the REST1$b$ may reset the second electrode ELT2 with the common voltage Vcom.

After the first sensor gate line SGL1 is deactivated, the third display gate line DGL3 is activated and the display and sensing operations described above are repeatedly performed. However, as will be described below, the sensing operation of the second sub sensing unit SENU2 may be different from that of the first sub sensing unit SENU1. For convenience of explanation, the second sub sensing unit SENU2 is not illustrated in FIG. 8.

FIGS. 8 and 9 illustrate a case where one first sub sensing unit SENU1 is included in every two display units. However, the number of display units that share one first sub sensing unit SENU1 is not limited, and may vary according to desired touch sensitivity and display pixel size. For example, when a display pixel is small or high touch sensitivity is used, the number of display units that share one first sub sensing unit SENU1 may be greater than in a case illustrated in FIG. 8.

Figure 10:
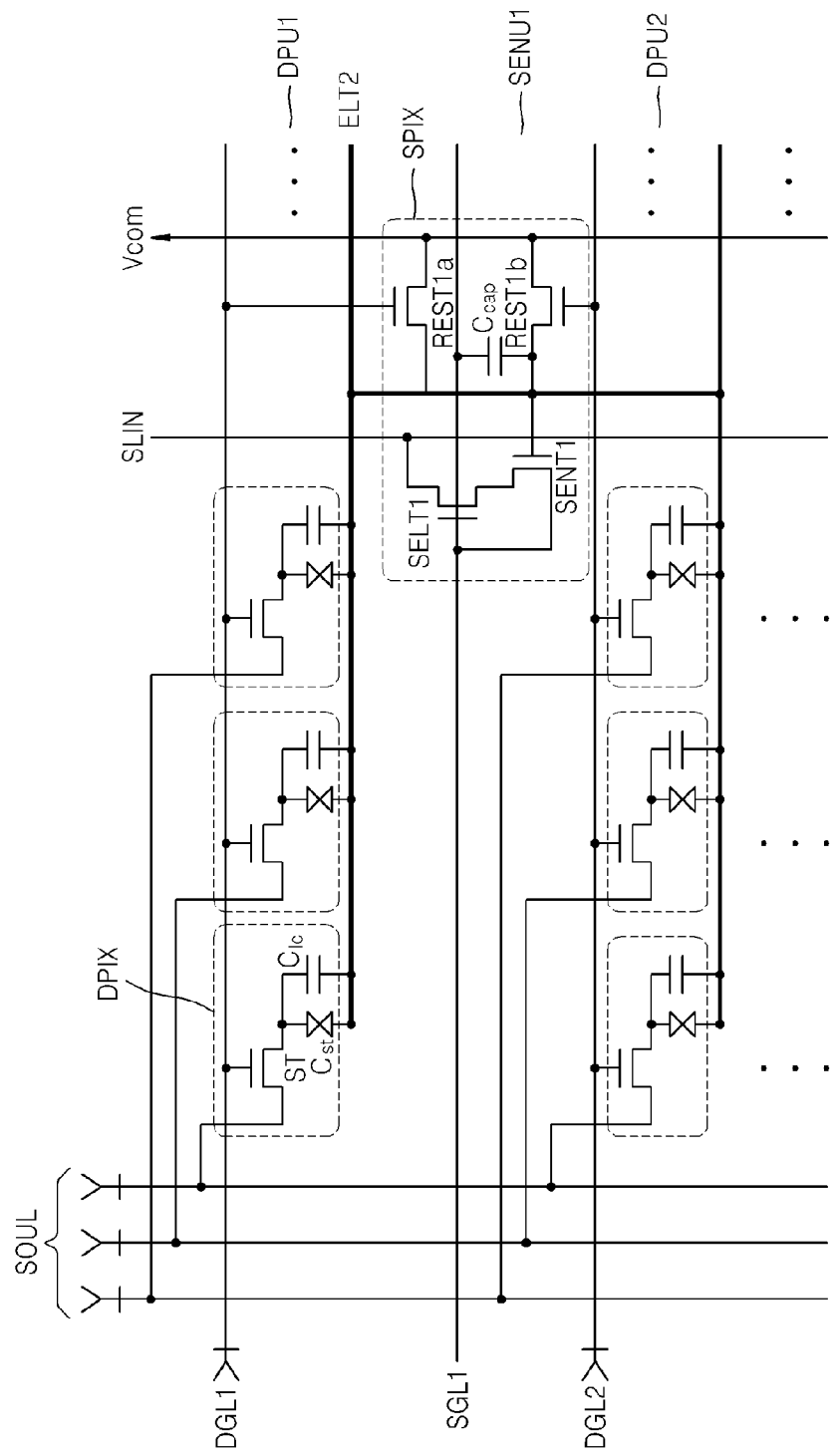
FIGS. 10 and 11 illustrate a structure and operation of the touch panel of FIG. 5, according to another example embodiment.
Figure 11:
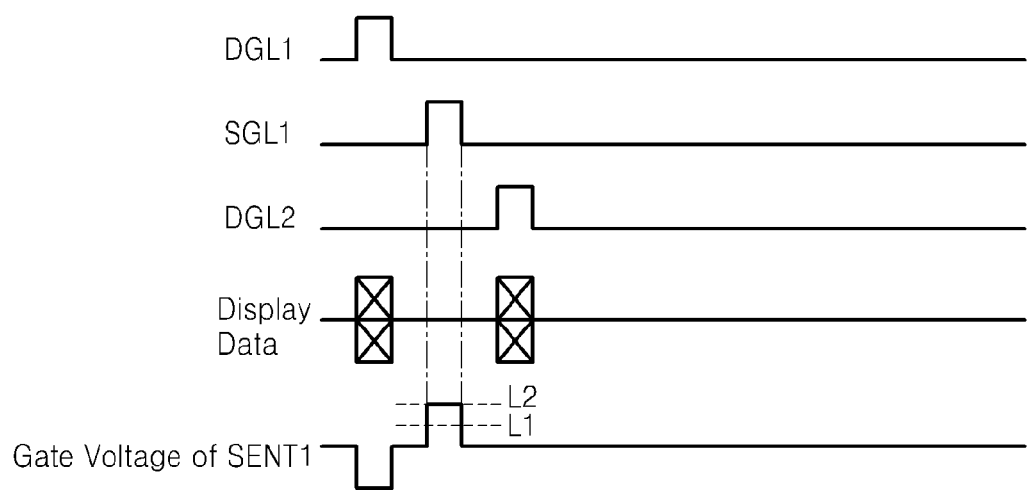

Also, one first sub sensing unit SENU1 may not be shared by two or more display units. As illustrated in FIGS. 10 and 11, one first sub sensing unit SENU1 may be included in each of display units. A case where one first sub sensing unit SENU1 is included in each of the display units may also be set according to touch sensitivity and display pixel size.

In the embodiment of FIG. 8, the first sub sensing unit SENU1 includes both the first reset transistors REST1$a$ and REST1$b$ that reset the second electrode ELT2 before a sensing operation of the first sub sensing unit SENU1 is performed, and the second electrode ELT2 is reset after the sensing operation of the first sub sensing unit SENU1 is performed and when the display gate line DGL3 is activated, but the example embodiments are not limited thereto.

Figure 12:
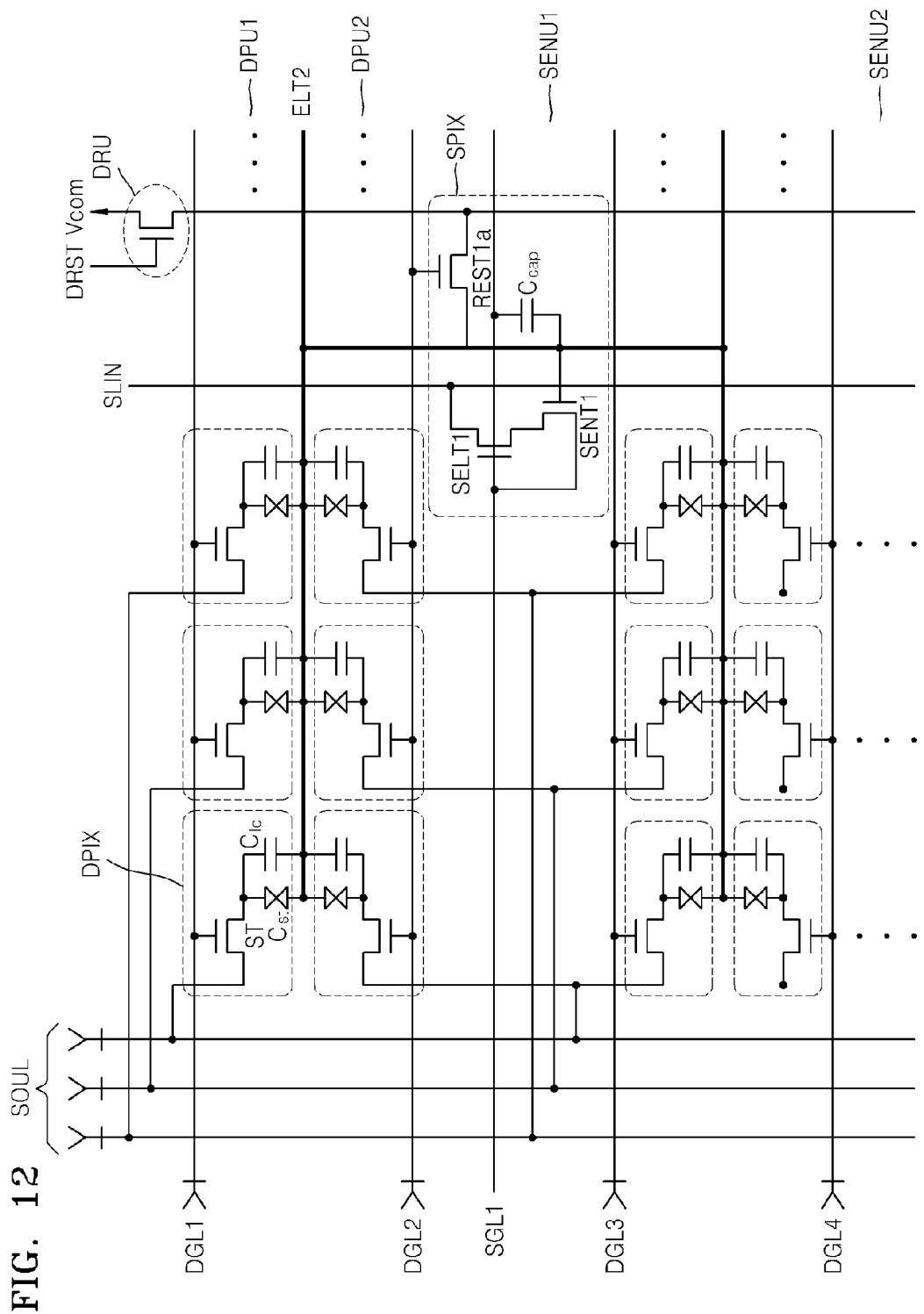
FIGS. 12 and 13 illustrate a structure and operation of the touch panel of FIG. 5, according to another example embodiment.
Figure 13:
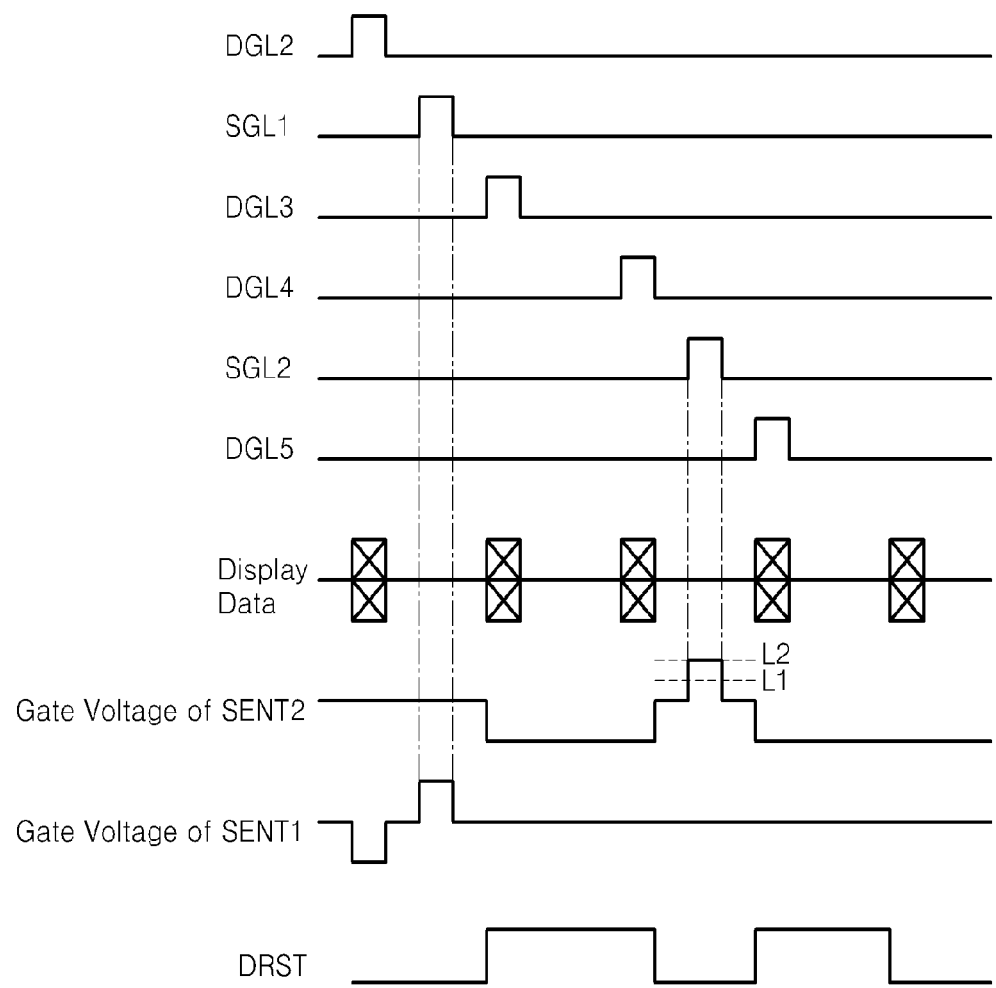

Referring to FIGS. 12 and 13, a first sub sensing unit SENU1 of the touch panel TP may include only a first reset transistor REST1$a$, and may additionally include a display reset unit DRU. Thus, a second electrode ELT2 may be reset by the first reset transistor REST1$a$ before a sensing operation of the first sub sensing unit SENU1 is performed, and may be reset by the display reset unit DRU in response to a display reset signal DRST after the sensing operation of the first sub sensing unit SENU1 is performed and when a display gate line DGL is activated. The display reset signal DRST may be transmitted to the display reset unit DRU by a control logic (not shown) that may be included in a touch screen apparatus THCA described below with reference to FIG. 33.

Examples of the first sub sensing unit SENU1 of FIG. 1 have been described above. Examples of the second sub sensing unit SENU2 of FIG. 1 will now be described.

Figure 14A:
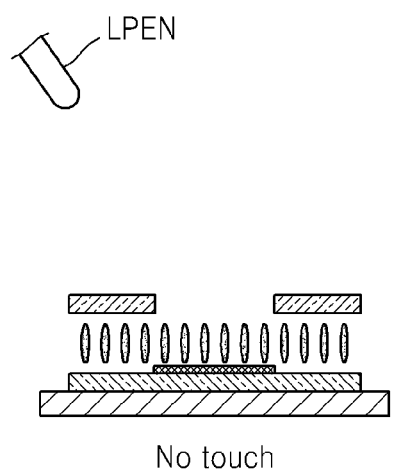
FIGS. 14A-14B illustrate an object sensed by a second sub sensing unit of FIG. 1.
Figure 14B:
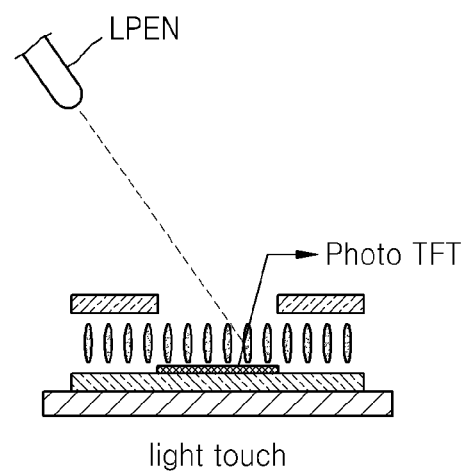

FIGS. 14A-14B illustrate an object sensed by the second sub sensing unit SENU2 of FIG. 1. Referring to FIGS. 1 and 14A and 14B, sensing current $I_{sen}$ sensed by the second sub sensing unit SENU2 may be a variation in current corresponding to a touch of light incident on the touch panel TP. The light incident on the touch panel TP may be light emitting from a light pen LPEN of FIGS. 14A-14B. A touch screen apparatus (not shown) including the touch panel TP may generate a touch event from a remote distance by using a light pen or the like. When light is incident on the touch panel TP as illustrated in FIG. 14B, current is generated by a photo thin-film transistor (TFT) which is a light-receiving device, and the second sub sensing unit SENU2 may sense the current.

Thus, the touch panel TP is capable of sensing not only optical touch but also physical touch as described above, and may thus by implementing a product employing a laser remote control technology, e.g., an electronic blackboard or a large-scale smart television (TV). Furthermore, since the touch panel TP is manufactured to be capable of sensing different types of touches, manufacturing costs are reduced, thereby securing competitive price. Also, since the touch panel TP may perform sensing at high speeds through current sensing other than charge sensing, the touch panel TP may be easily applied to a large-scale panel using a high frame frequency. Optical sensing performed by the second sub sensing unit SENU2 of the touch panel TP will be described below in detail.

Figure 15:
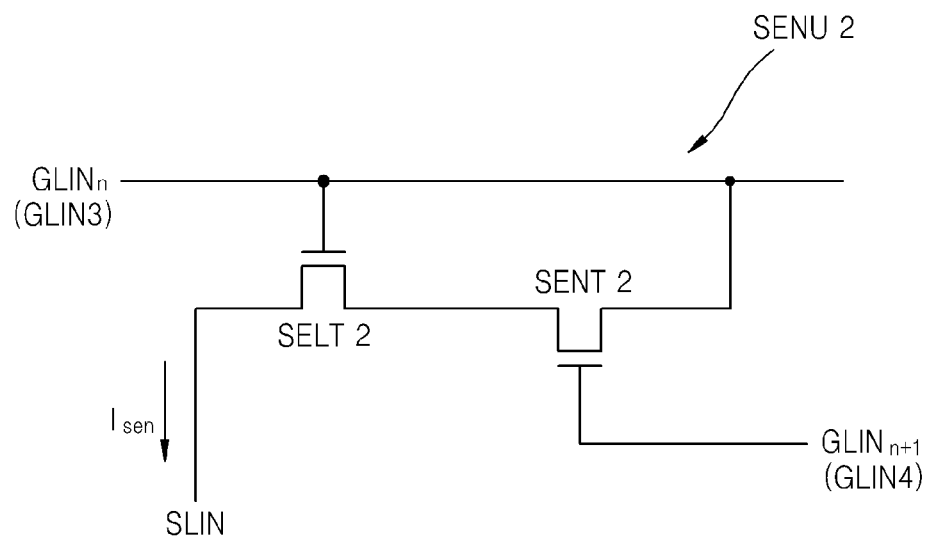
FIG. 15 is a circuit diagram of a second sub sensing unit of FIG. 1 that performs a sensing operation illustrated in FIG. 14, according to an example embodiment.

FIG. 15 is a circuit diagram of the second sub sensing unit SENU2 of FIG. 1 that performs the sensing operation illustrated in FIGS. 14A-14B, according to an example embodiment. Referring to FIGS. 1 and 15, the second sub sensing unit SENU2 may include a second sensing transistor SENT2 and a second selection transistor SELT2. The second sensing transistor SENT2 may be a photo transistor such as shown in FIG. 14($b$), or may be embodied as an oxide semiconductor transistor. The features of the oxide semiconductor transistor are described below. The transistors SELT1, SELT2, SENT1, and REST1 described above may also be oxide semiconductor transistors but are not limited thereto.

While a gate voltage that is lower than a threshold voltage is applied to the second sensing transistor SENT2, the second sensing transistor SENT2 senses a variation in a drain-source current according to whether light is incident thereon. One terminal, the other terminal, and a gate of the second sensing transistor SENT2 are connected to a gate line GLINn, the second selection transistor SELT2, and a gate line GLINn+1, respectively. The gate line GLINn may be the same as the third gate line GLIN3 of FIG. 1, and the gate line GLINn+1 may be the same as the fourth gate line GLIN4 of FIG. 1. As described above, the third gate line GLIN3 of FIG. 1 may be a sensor gate line that is activated during a sensing operation, and the fourth gate line GLIN4 may be a display gate line that is activated during a display operation.

One terminal, the other terminal, and a gate of the second selection transistor SELT2 may be connected to a sensing line SLIN, the other terminal of the second sensing transistor SENT2, and the gate line GLINn, respectively.

When the gate line GLINn is activated and a voltage that is higher than the threshold voltage is thus applied to the gate of the second selection transistor SELT2, the second selection transistor SELT2 is turned on. When the gate line GLINn+1 is deactivated, the second sensing transistor SENT2 is turned off. Gate lines of the touch panel TP are sequentially activated such that only one of the gate lines is activated at a time. Thus, while the gate line GLINn is activated, the gate line GLINn+1 is deactivated. Thus, the second sensing transistor SENT2 gated by the gate line GLINn+1 is turned off. As described above, the second sensing transistor SENT2 may be a photo transistor embodied as an oxide semiconductor transistor.

Thus, sensing current $I_{sen}$ corresponding to the drain-source current of the second sensing transistor SENT2 flows from the source (the other terminal) of the second sensing transistor SENT2 to the sensing line SLIN via the turned-on second selection transistor SELT2. The amount of the sensing current $I_{sen}$ supplied to the sensing line SLIN from the second sensing transistor SENT2 varies according to the intensity of light incident on the second sensing transistor SENT2, as illustrated in FIG. 16.

When the gate line GLINn is deactivated and the gate line GLINn+1 is activated, the second selection transistor SELT2 is turned off and the second sensing transistor SENT2 is turned on to reset the second sensing transistor SENT2 by a voltage applied to the gate line GLINn+1. Such a reset operation is performed to remove electric charges trapped in the second sensing transistor SENT2 which is a photo transistor, as will be described in detail with reference to FIG. 16 below.

Figure 16:
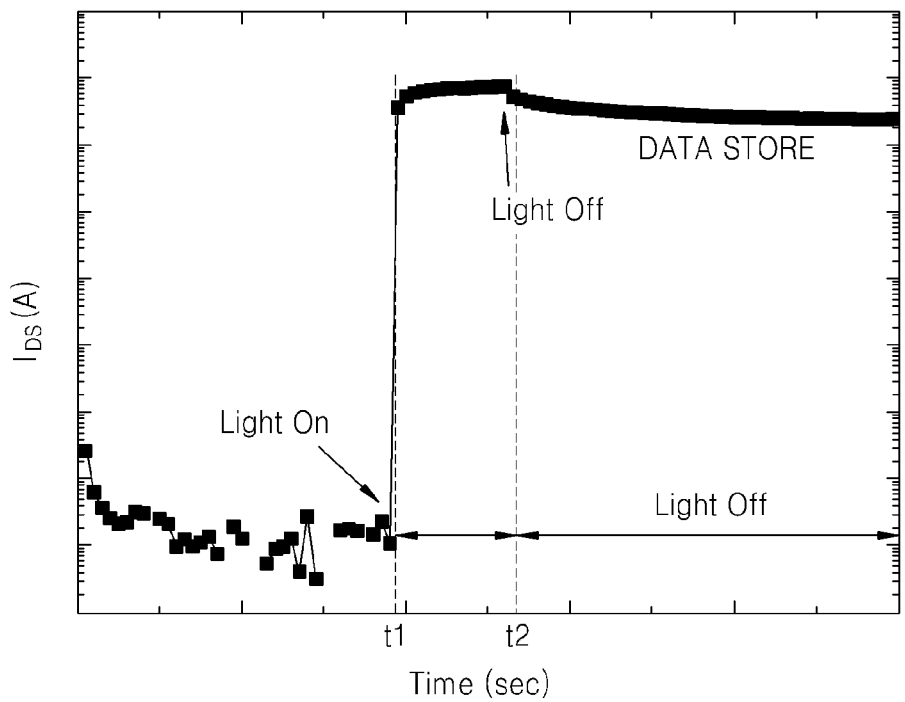
FIG. 16 is a graph showing features of the second sensing transistor of FIG. 15, according to an example embodiment.

FIG. 16 is a graph showing the features of the second sensing transistor SENU2 of FIG. 15, according to an example embodiment. Referring to FIGS. 15 and 16, at a point of time t1, light is incident on the second sensing transistor SENT2 to increase an amount of drain-source current IDS of the second sensing transistor SENT2. Then, even though at a point of time t2, the incident light is discontinued, the amount of the drain-source current IDS is hardly reduced and is maintained to be substantially the same as when the light was incident on the second sensing transistor SENT2. Such a phenomenon occurs, since the second sensing transistor SENT2 is embodied as an oxide semiconductor transistor having a channel layer formed of an oxide semiconductor and electric charges may be trapped in the channel layer or at a surface of the channel layer. The oxide semiconductor may include ZnO, InO, SnO, InZnO, ZnSnO, or InSnO, or may include a combination of ZnO, InO, SnO, InZnO, ZnSnO, or InSnO and at least one material selected from the group consisting of Hf, Zr, Ti, Ta, Ga, Nb, V, Al, and Sn.

For example, when light and a negative gate voltage are supplied to the second sensing transistor SENT2 that is an oxide semiconductor transistor, holes generated in the channel layer due to the light may be moved to and trapped at the interface between the gate insulating film and the channel layer. The trapped electric charges may not be removed until a sufficient high positive (+) voltage is applied to a gate of the second sensing transistor SENT2. Thus, once the electric charges are trapped, the amount of the drain-source current $I_{DS}$ may not be reduced even if the incident light is discontinued. The electric charges trapped in the second sensing transistor SENT2 that is an oxide semiconductor transistor may be removed through the reset operation as described above.

A touch panel capable of sensing light uses a fine optical sensing device capable of sensing light. An example of the optical sensing device may be an amorphous silicon TFT (a-Si TFT). When light is sensed using such an oxide semiconductor transistor, electron mobility is high, the light can thus be easily sensed, and only a switch transistor (second selection transistor SELT2 of FIG. 15) for switching the oxide semiconductor transistor is used. Thus, when a touch panel is designed or produced, it is possible to remove limitations to increasing the size of the touch panel due to a parasitic capacitance and prevent a delay in a sensing operation.

Figure 17:
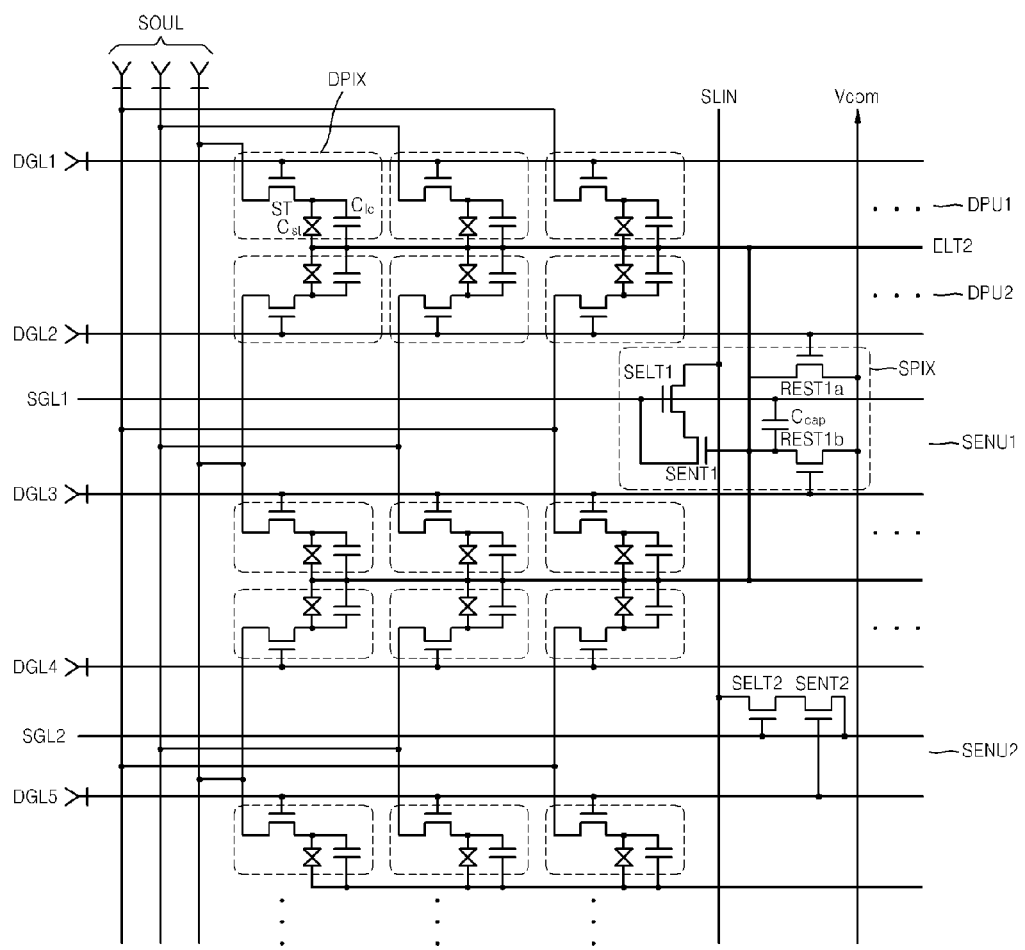
FIG. 17 is a circuit diagram illustrating in detail an example of the touch panel of FIG. 1.
Figure 18A:
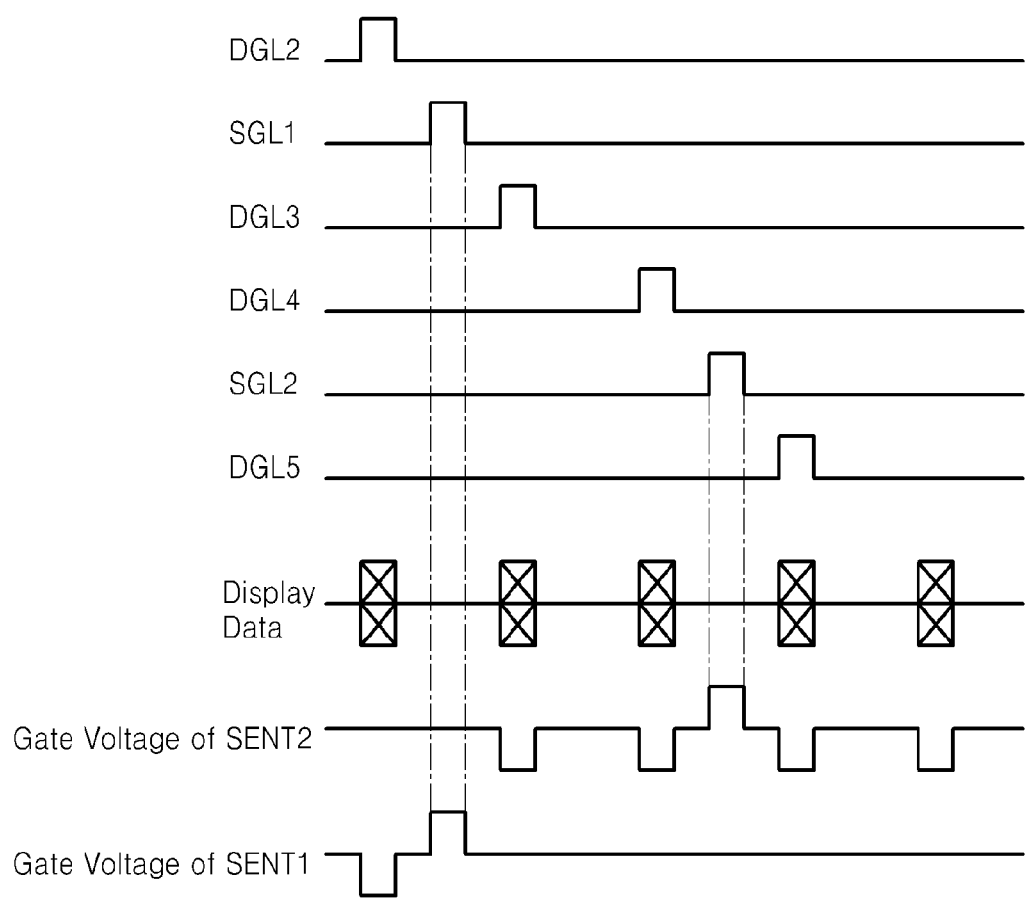
FIG. 18A is a timing diagram illustrating an operation of the touch panel of FIG. 17, according to another example embodiment.

FIG. 17 is a circuit diagram illustrating in detail an example of the touch panel TP of FIG. 1. FIG. 18A is a timing diagram illustrating an operation of the touch panel TP of FIG. 17, according to another example embodiment. Referring to FIGS. 17 and 18A, a first sub sensing unit SENU1 and a second sub sensing unit SENU2 may be the same as the first sub sensing unit SENU1 of FIG. 6 and the second sub sensing unit SENU2 of FIG. 15, respectively, and are thus not described in detail here again.

When a first display gate line DGL1 and a second display gate line DGL2 are sequentially activated, a first display unit DPU1 and a second display unit DPU2 sequentially drive a liquid crystal (not shown) and a first sensor gate line SGL1 is then activated. As a voltage applied to the first sensor gate line SGL1 changes from logic low (L) to logic high (H) and the first sensor gate line SGL1 is thus activated, the first selection transistor SELT1 is turned on. Thus, a voltage variation Vvar in a second electrode ELT2, caused by a finger capacitance Cfig, is sensed as sensing current $I_{sen}$ by a first sensing transistor SENT1. As described above, a gate voltage of the first sensing transistor SENT1 may have a first level L1 when the finger capacitance Cfig is formed and may have a second level L2 when the finger capacitance Cfig is not formed.

When the voltage applied to the first sensor gate line SGL1 changes again from the logic high H to logic low L and the first sensor gate line SGL1 is thus deactivated, a third display gate line DGL3 and a fourth display gate line DGL4 are sequentially activated to perform a display operation. A reset operation of the first sub sensing unit SENU1 when the third display gate line DGL3 is activated is as described above and is not described here in detail.

Then, a second sensor gate line SGL2 is activated. When a voltage applied to the second sensor gate line SGL2 changes from logic low L to logic high H and the second sensor gate line SGL2 is thus activated, a second selection transistor SELT2 is turned on. Thus, sensing current $I_{sen}$ corresponding to a variation in light sensed by the second sensing transistor SENT2 is supplied to a sensing line SLIN. A reset operation of the second sub sensing unit SENU2 when a fifth display gate line DGL5 is activated is as described above and is not described again here.

Figure 18B:
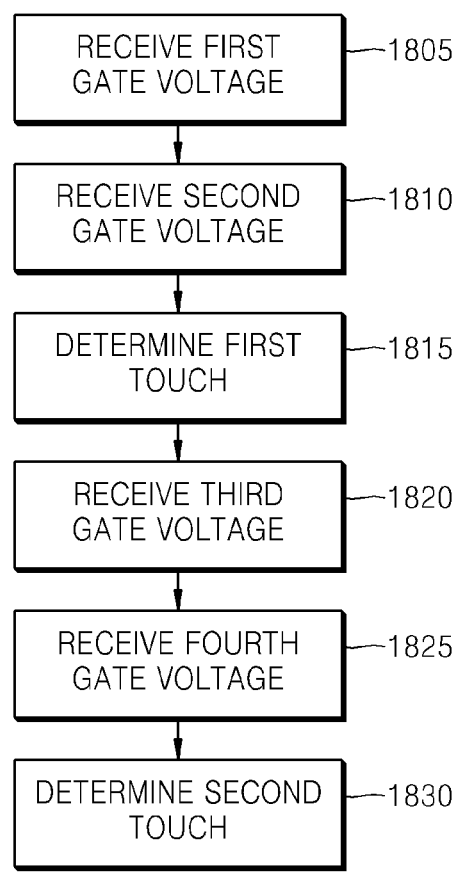
FIG. 18B illustrates a method of operating a touch panel according to an example embodiment.

FIG. 18B illustrates a method of operating the touch panel TP according to an example embodiment. The method may be performed by the touch panel TP shown in FIG. 1 and the circuit diagram shown in FIG. 17. At 1805, the circuit receives a first gate voltage on a first gate line. At 1810, the circuit receives a second gate voltage on a second gate line. At 1815, the circuit performs a determination of whether a touch of a first type has occurred based on the received first and second voltages. For example, a voltage variation Vvar in a second electrode ELT2, caused by a finger capacitance Cfig, is sensed as sensing current $I_{sen}$ by a first sensing transistor SENT1 and is supplied to a sensing line SLIN. At 1820, the circuit receives a third gate voltage on a third gate line. At 1825, the circuit receives a fourth gate voltage on a fourth gate line. At 1830, the circuit performs a determination of whether a touch of a second type has occurred based on the third and fourth receiving. The second type is different than the first type. For example, a sensing current $I_{sen}$ corresponding to a variation in light sensed by the second sensing transistor SENT2 is supplied to a sensing line SLIN.

Figure 19:
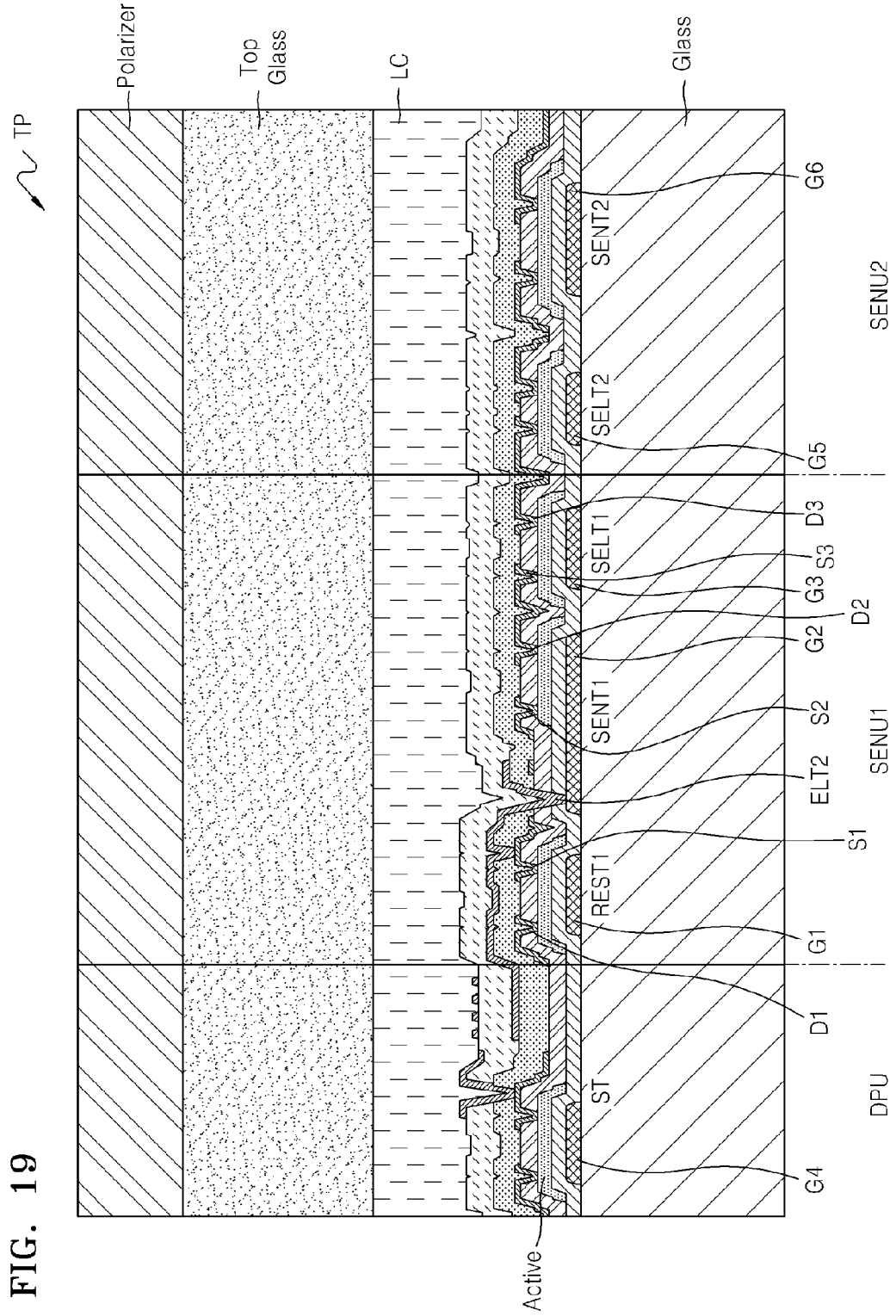
FIG. 19 is a cross-sectional view of a part of the touch panel of FIG. 17.

FIG. 19 is a cross-sectional view of a part of the touch panel of FIG. 17. Referring to FIGS. 17 and 19, a display unit DPU, a first sub sensing unit SENU1, and a second sub sensing unit SENU2 are formed on a glass substrate. Gates G1 to G6 of a switching transistor ST of a display pixel DPIX of the display unit DPU, a first reset transistor REST1, a first sensing transistor SENT1, and a first selection transistor SELT1 of the first sub sensing unit SENU1, and a second sensing transistor SENT2 and a second selection transistor SELT2 of the second sub sensing unit SENU2 are formed; and active areas Active that are insulated from the gates G1 to G6 via insulators are respectively formed. The active areas Active may be electrically connected to source and drain electrodes S1 and D1 and the like.

For convenience of explanation, in FIG. 19, sources and drains of the switching transistor ST, the second sensing transistor SENT2, and the second selection transistor SELT2 are not illustrated. The first sub sensing unit SENU1 and the second sub sensing unit SENU2 that may not be connected to each other are illustrated to be disposed adjacent to each other. Although not shown in FIG. 19, a gate, source, or drain of each of the transistors may be connected to the gates lines DGL1 to DGL5, SGL1, and SGL2 of FIG. 17 or the sensing line SLIN of FIG. 1, via contacts (not shown). However, one terminal S1 of the first reset transistor REST1 is connected to a second electrode ELT2, a gate G2 of the first sensing transistor SENT1 is connected to the second electrode ELT2, and one terminal D2 of the first sensing transistor SENT1 is connected to one terminal S3 of the first selection transistor SELT1.

Figure 20:
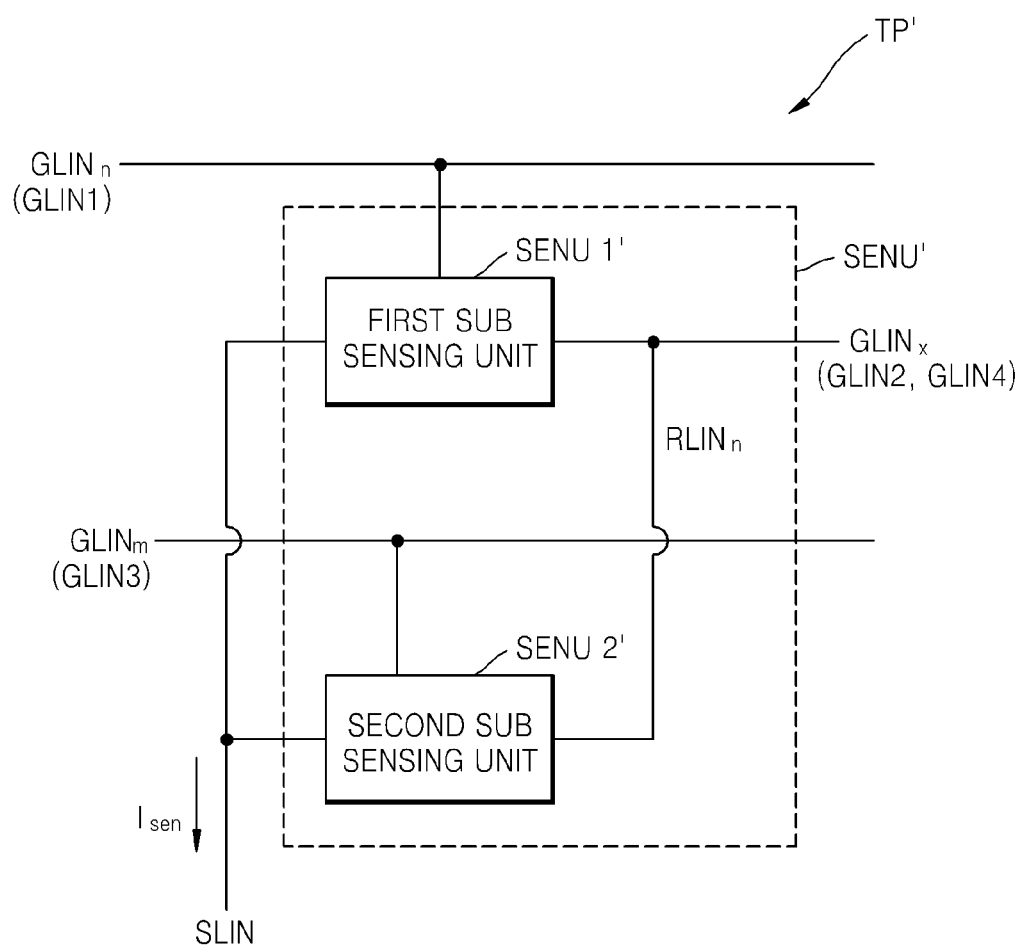
FIG. 20 illustrates another example of the touch panel having a sensing unit different from that of FIG. 1.

FIG. 20 illustrates another example of a touch panel TP of FIG. 1. While not shown in FIG. 20, the touch panel TP' includes the gate driver 100. Referring to FIGS. 1 and 20, the touch panel TP' includes a sensing unit $SENU^1$ that includes at least one pair of sensing units and that may thus sense different types of touch events as described above. The sensing unit SENU¹ may include a first sub sensing unit SENU1¹ and a second sub sensing unit SENU2¹ that sense different objects at different times, in response to activation of different gate lines.

The first sub sensing unit SENU1¹ senses a first type of touch variation in response to activation of a gate line GLINn, outputs sensing current $I_{sen}$ corresponding to the first type of touch variation to a sensing line SLIN, and is reset in response to deactivation of the gate line $GLIN_n$ and activation of a gate line $GLIN_x$. The second sub sensing unit SENU2¹ senses a second type of touch variation, which is different from the first type of touch variation, in response to activation of a gate line $GLIN_m$, outputs sensing current $I_{sen}$ corresponding to the second type of touch variation to the sensing line SLIN, and is reset in response to deactivation of the gate line $GLIN_m$ and activation of the gate line $GLIN_x$.

The gate line $GLIN_n$ of FIG. 20 may be the same as the first gate line GLIN1 of FIG. 1, and the gate line $GLIN_m$ of FIG. 20 may be the same as the third gate line GLIN3 of FIG. 1. The gate line $GLIN_x$ of FIG. 20 may be the same as the second gate line GLIN2 or the fourth gate line GLIN4 of FIG. 1.

For example, the gate line $GLIN_n$ and the gate line $GLIN_m$ may be disposed adjacent to each other. A common reset line $RLIN_n$ for resetting the first sub sensing unit SENU1¹ and the second sub sensing unit SENU2¹ may be connected to the same gate line $GLIN_x$. For example, the gate line $GLIN_x$ may be disposed adjacent to the gate line $GLIN_m$ or the gate line $GLIN_n$.

Figure 21A:
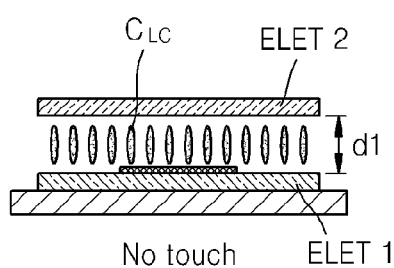
FIGS. 21A-21B illustrate an object sensed by a first sub sensing unit of FIG. 20.
Figure 21B:
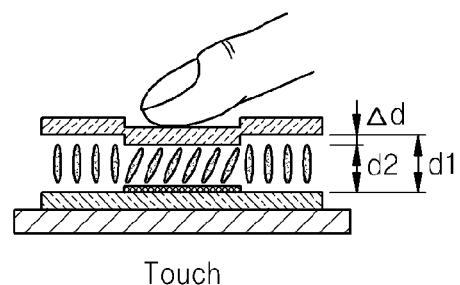

FIGS. 21A-21B illustrate an object sensed by the first sub sensing unit SENU1 of FIG. 20. Referring to FIGS. 20 and 21A-21B, sensing current $I_{sen}$ sensed by the first sub sensing unit SENU1¹ may be a value indicating whether a cell capacitance corresponding to a variation in the distance between the first and second electrodes ELET1 and ELET2 of the touch panel TP', caused by a physical touch (e.g., touching a liquid crystal with a finger), changes. For example, it is assumed that as illustrated in FIG. 21A, the distance between the first electrode ELET1 and the second electrode ELET2 when the touch panel TP is not physically touched is d1. The first electrode ELET1 may be a pixel electrode and the second electrode ELET2 may be a common electrode. As illustrated in FIG. 21B, when the distance between the first electrode ELET1 and the second electrode ELET2 is reduced to d2 due to a physical touch, a variation Δd in the distance between the first electrode ELET1 and the second electrode ELET2 becomes (d1-d2). Since a cell capacitance $C_{LC}$ is inversely proportional to a distance, the cell capacitance $C_{LC}$ changes to correspond to a variation in the distance between the first electrode ELET1 and the second electrode ELET2. Locations of the first electrode ELET1 and the second electrode ELET2 are illustrated in FIGS. 21A and 21B for convenience of explanation, but example embodiments are not limited thereto. The first electrode ELET1 and the second electrode ELET2 may be disposed in the touch panel TP' as illustrated in FIGS. 3A-3B.

Figure 22:
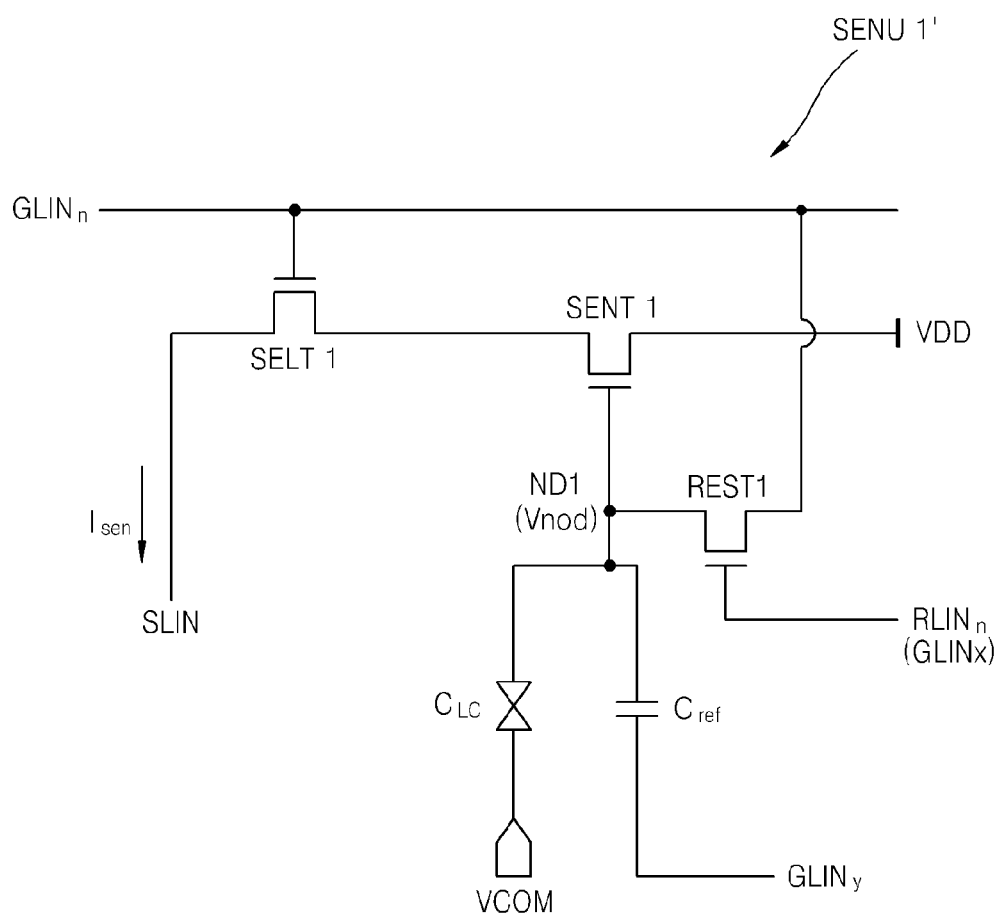
FIG. 22 is a circuit diagram illustrating an example of the first sub sensing unit of FIG. 20 that performs a sensing operation as illustrated in FIGS. 21A-21B.

FIG. 22 is a circuit diagram illustrating an example of the first sub sensing unit SENU1' of FIG. 20 that performs a sensing operation as illustrated in FIG. 21. Referring to FIG. 22, a first sub sensing unit SENU1' may include a first sensing transistor SENT1, a first selection transistor SELT1, and a first reset transistor REST1. The first sensing transistor SENT1 senses a variation in a cell capacitance $C_{LC}$. One terminal, the other terminal, and a gate of the first sensing transistor SENT1 are connected to a power supply voltage VDD source, one terminal of the first selection transistor SELT1, and a first node ND1, respectively. The first node has a voltage $V_{nod}$ corresponding to the cell capacitance $C_{LC}$. Hereinafter, the voltage of the first node ND1 will be referred to as 'node voltage $V_{nod}$'.

Figure 27:
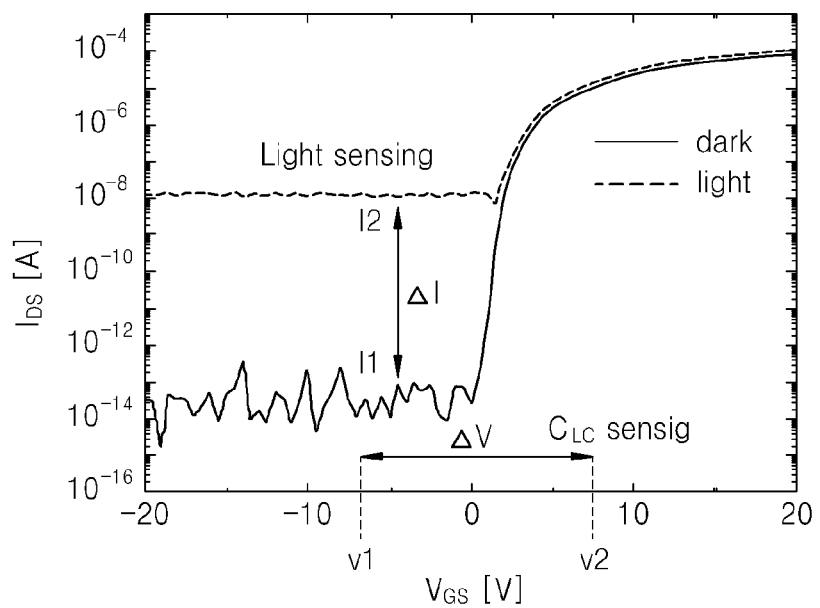
FIG. 27 is a graph showing a sensing operation of the touch panel of FIG. 20 according to another example embodiment.

The node voltage $V_{nod}$ may be expressed as follows:

$$V_{nod}=V_{reset}+(V_{COM}-V_{GL})\times C_{LC}/(C_{ref}+C_{LC}),\qquad\text{[Equation 1]}$$

wherein '$V_{reset}$' may denote a node voltage $V_{nod}$ of a reset first node, similar to a first voltage $V_1$ illustrated in FIG. 27, '$V_{COM}$' denotes a voltage applied to the second electrode ELET2 of FIG. 2, '$V_{GL}$' denotes a voltage applied to a gate line $GLIN_n$, and '$C_{ref}$' denotes a reference capacitance.

Figure 23:
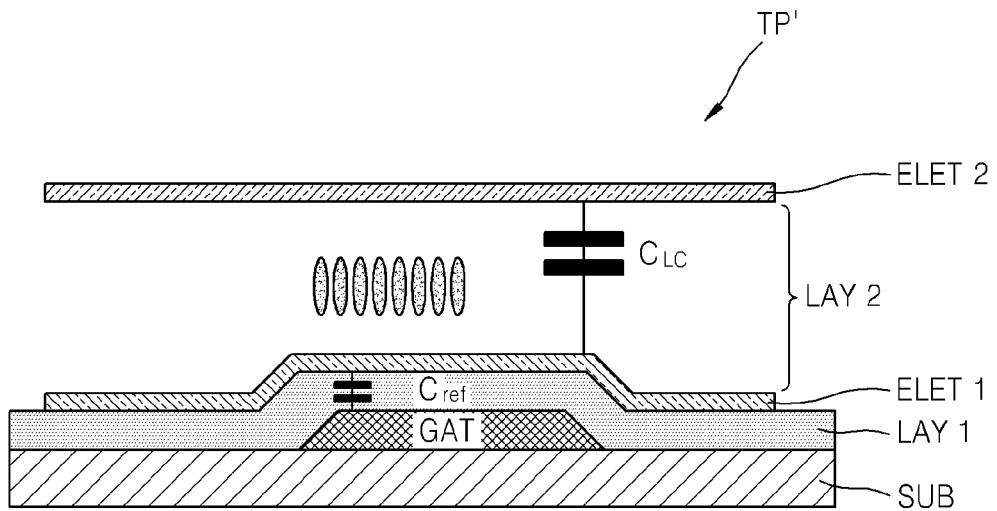
FIG. 23 is a diagram illustrating a concept of a cell capacitance illustrated in FIG. 22.

FIG. 23 is a diagram illustrating the concept of the cell capacitance $C_{LC}$ illustrated in FIG. 22.

Referring to FIGS. 22 and 23, a reference capacitance $C_{ref}$ is a capacitance formed on a first layer LAY1 between a gate GAT and a first electrode ELET1 on a substrate SUB of the touch panel TP', and the cell capacitance $C_{LC}$ is a cell capacitance formed on a second layer LAY2 between the first electrode ELET1 and a second electrode ELET2. The first layer LAY1 may be a layer treated with a gate insulator and passivation. The second layer LAY2 may be a layer filled with a conductive material. Locations of the first electrode ELET1 and the second electrode ELET2 illustrated in FIG. 23 are just illustrative and example embodiments are not limited thereto. In the touch panel TP', the first electrode ELET1 and the second electrode ELET2 may be disposed as illustrated in FIGS. 3A-3B. FIG. 22 illustrates a case where the reference capacitance $C_{ref}$ is formed between the first node ND1 and an arbitrary gate line $GLIN_y$. An example of the arbitrary gate line $GLIN_y$ is described with reference to FIG. 25 below.

When a physical touch occurs as illustrated in FIG. 21B to reduce the thickness of the second layer LAY2, the reference capacitance $C_{ref}$ is a fixed value but a cell capacitance $C_{LC}$ increases. Thus, a node voltage $V_{nod}$ is increased. When the node voltage $V_{nod}$ is greater than a threshold voltage of the first sensing transistor SENT1, the first sensing transistor SENT1 is turned on to form drain-source current corresponding to a gate-source voltage of the first sensing transistor SENT1.

In FIG. 22, one terminal, the other terminal, and a gate of the first selection transistor SELT1 may be connected to a sensing line SLIN, one terminal of the first sensing transistor SENT1, and a gate line $GLIN_n$, respectively. The first selection transistor SELT1 may supply drain-source current corresponding to a variation in a gate-source voltage of the first sensing transistor SENT1 (variation in the node voltage $V_{nod}$ of the first node ND1) to the sensing line SLIN, in response to activation of a first gate line.

One terminal, the other terminal, and a gate of the first reset transistor REST1 may be connected to a gate of the first sensing transistor SENT1, the gate line $GLIN_n$, and a reset line $RLIN_n$, respectively. Thus, when the gate line $GLIN_n$ is deactivated and the reset line $RLIN_n$ is activated, the first reset transistor REST1 is turned on to reset the node voltage $V_{nod}$. As described above, the reset line $RLIN_n$ may be connected to a gate line $GLIN_x$ and may thus be activated in the same manner as the gate line $GLIN_x$ is activated.

Figure 24:
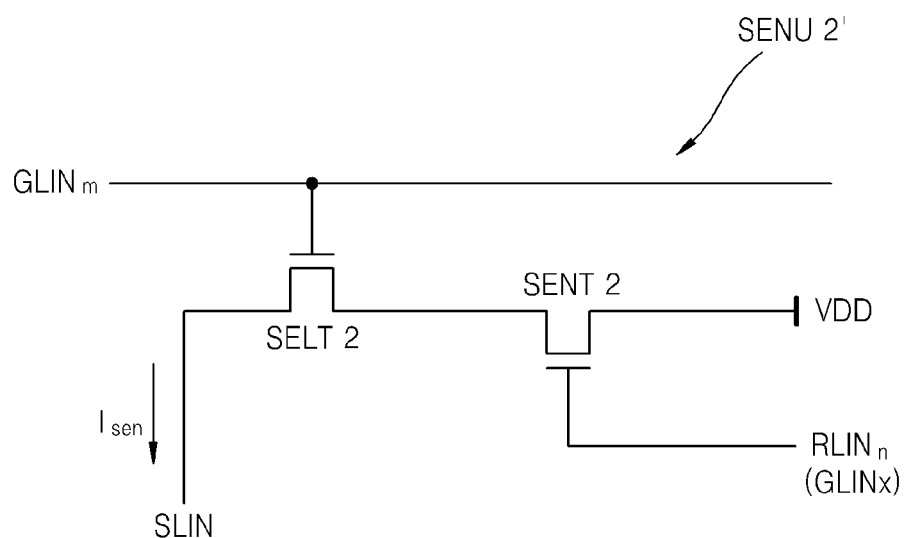
FIG. 24 is a circuit diagram of an example of a second sub sensing unit of FIG. 20.

FIG. 24 is a circuit diagram of an example of the second sub sensing unit SENU2¹ of FIG. 20. Referring to FIGS. 20 and 24, the second sub sensing unit SENU2 may include a second sensing transistor SENT2 and a second selection transistor SELT2. The second sensing transistor SENT2 may be a photo transistor embodied as the oxide semiconductor transistor of FIG. 14B. As described above, the other transistors SELT1, SELT2, SENT1, and REST may also be oxide semiconductor transistors but the example embodiments are not limited thereto.

While a gate voltage that is lower than a threshold voltage is applied to the second sensing transistor SENT2, the second sensing transistor SENT2 senses a variation in drain-source current according to whether light is incident thereon. One terminal, the other terminal, and a gate of the second sensing transistor SENT2 are connected to a power supply voltage VDD source, the second selection transistor SELT2, and a reset line $RLIN_n$. One terminal, the other terminal, and a gate of the second selection transistor SELT2 are connected to a sensing line SLIN, the other end of the second sensing transistor SENT2, and a gate line $GLIN_m$.

When the gate line $GLIN_m$ is activated to apply a voltage, which is equal to or higher than the threshold voltage, to the gate of the second selection transistor SELT2, the second selection transistor SELT2 is turned on. On the other hand, when the reset line $RLIN_n$ is deactivated, the second sensing transistor SENT2 is turned off. As described above, the reset line $RLIN_n$ is connected to a gate line other than the gate line $GLIN_m$. The gate lines of the touch panel TP are sequentially activated such that only one of the gate lines is activated at a time. Thus, while the gate line $GLIN_m$ is activated, the gate line connected to the reset line $RLIN_n$ are deactivated. Thus, the second sensing transistor SENT2 gated by the reset line $RLIN_n$ is turned off.

Thus, sensing current $I_{sen}$ corresponding to drain-source current of second sensing transistor SENT2 flows to the sensing line SLIN via the turned-on second selection transistor SELT2, i.e., from the source (the other end) of the second sensing transistor SENT2 to the sensing line SLIN. The second selection transistor SELT2 may be turned off when the gate line $GLIN_m$ is deactivated, and may be turned on and reset when the reset line $RLIN_n$ is activated.

Figure 25:
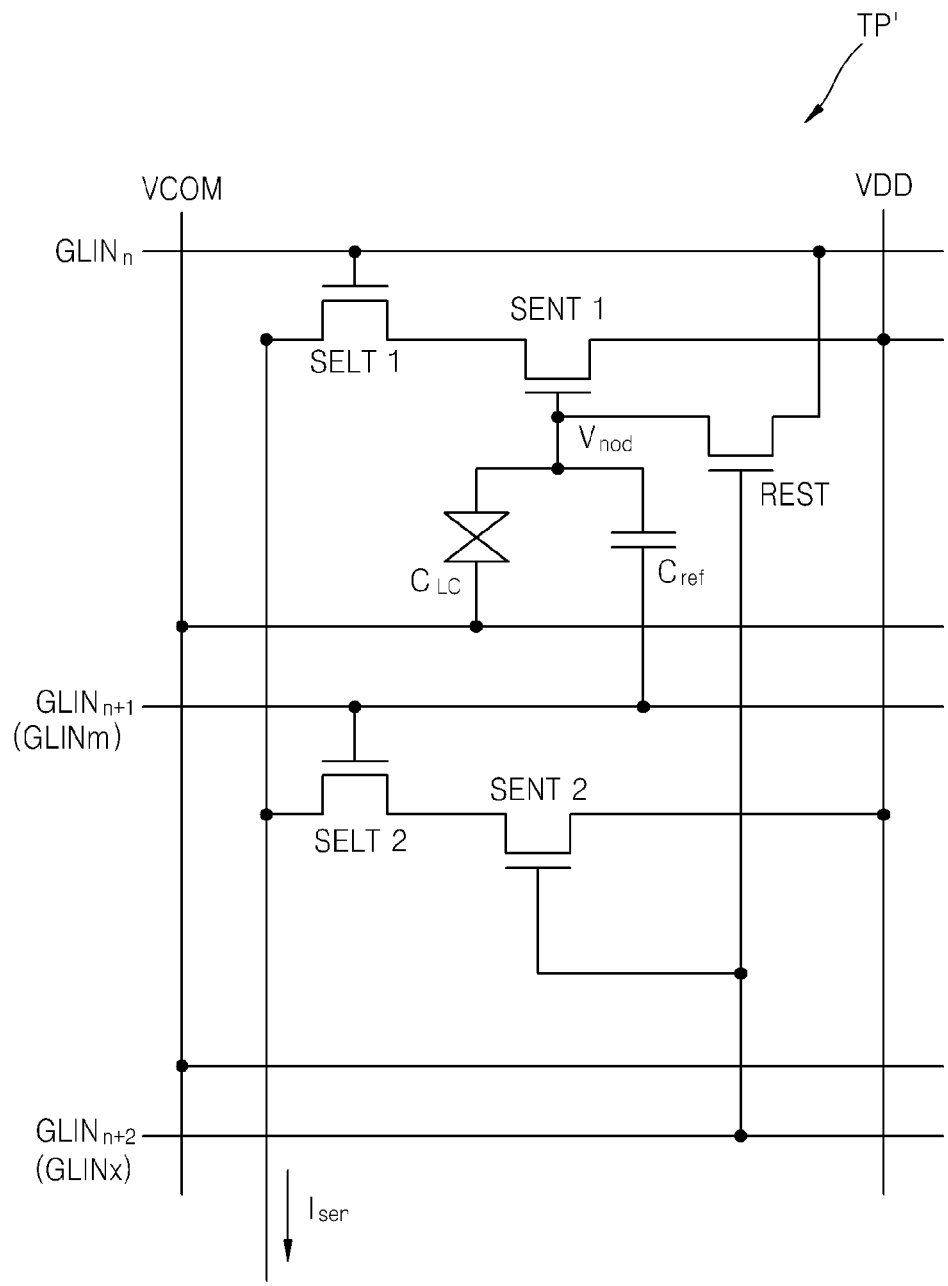
FIG. 25 is a circuit diagram illustrating in detail an example of the touch panel of FIG. 20 including the first sub sensing unit of FIG. 22 and the second sub sensing unit of FIG. 24.
Figure 26:
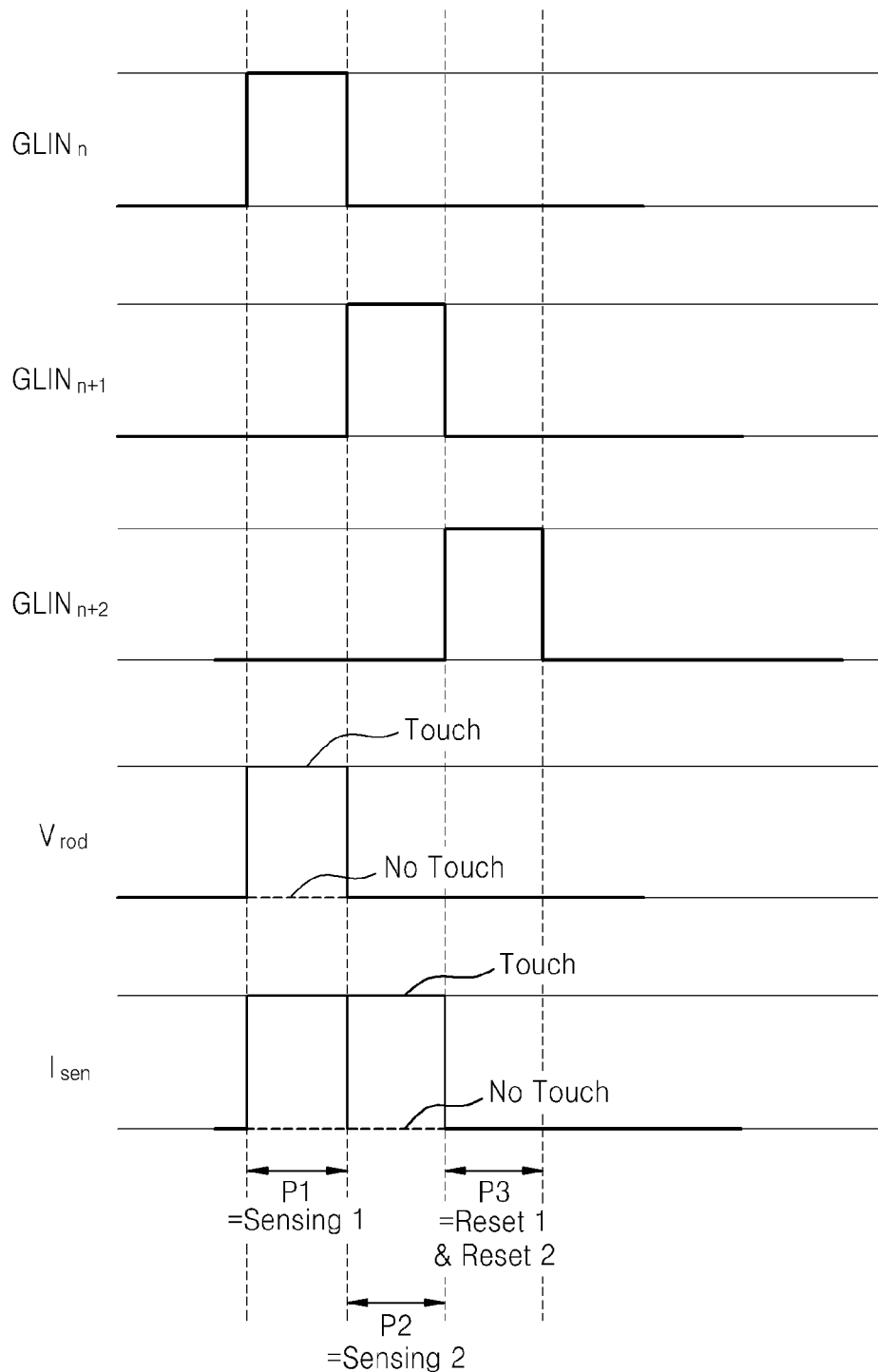
FIG. 26 is a timing diagram illustrating operations of the first and second sub sensing units of FIG. 25, according to another example embodiment.

FIG. 25 is a circuit diagram illustrating in detail an example of the touch panel TP' of FIG. 20 including the first sub sensing unit SENU1' of FIG. 22 and the second sub sensing unit SENU2' of FIG. 24. FIG. 26 is a timing diagram illustrating operations of the first and second sub sensing units SENU1' and SENU2' of FIG. 25. Referring to FIGS. 25 and 26, the touch panel TP' includes the first sub sensing unit SENU1' of FIG. 22 and the second sub sensing unit SENU2' of FIG. 24, in which gates of a first selection transistor SELT1 of the first sub sensing unit SENU1' and a second selection transistor SELT2 of the second sub sensing unit SENU2' are connected to adjacent gate lines $GLIN_n$ and $GLIN_{n+1}$, respectively. For example, the gate line $GLIN_m$ of FIG. 24 may be the same as the gate line $GLIN_{n+1}$ adjacent to the gate line $GLIN_n$. The first sub sensing unit SENU1' and the second sub sensing unit SENU2' may sequentially perform a sensing operation (generation of sensing current $I_{sen}$) when the adjacent gate lines $GLIN_n$ and $GLIN_{n+1}$ are sequentially activated.

Reset lines $RLIN_n$ of the first sub sensing unit SENU1' and the second sub sensing unit SENU2' may be commonly connected to a gate line $GLIN_{n+2}$. For example, a gate line $GLIN_x$ connected to the reset line $RLIN_n$ of FIG. 22 and a gate line $GLIN_x$ connected to the reset line $RLIN_n$ of FIG. 24 may be commonly connected to the gate line $GLIN_{n+2}$. The gate line $GLIN_{n+2}$ may be located adjacent to the gate line $GLIN_{n+1}$. The first sub sensing unit SENU1' and the second sub sensing unit SENU2' may sequentially perform the sensing operation, and may be simultaneously reset in response to activation of the gate line $GLIN_{n+2}$.

A reference capacitor $C_{ref}$ of the first sub sensing unit SENU1' included in the touch panel TP' of FIGS. 25 and 26 is connected to the gate line $GLIN_{n+1}$ but the example embodiments are not limited thereto. As described above, the reference capacitor $C_{ref}$ of the first sub sensing unit SENU1' may be a gate line, e.g., a gate line $GLIN_{n-1}$ (not shown), among the two gate lines adjacent to the gate line $GLIN_n$, except for the gate line $GLIN_{n+1}$.

When a voltage applied to the gate line $GLIN_n$ changes from logic low L to logic high H and the gate line $GLIN_n$ is thus activated, the first selection transistor SELT1 is turned on to apply a variation (node voltage $V_{nod}$) in a cell capacitance $C_{LC}$ sensed by the first sensing transistor SENT1 to the sensing line SLIN (P1=Sensing1). When the voltage applied to the gate line $GLIN_n$ changes from logic high H to logic low L and the gate line $GLIN_n$ is thus deactivated, a voltage applied to the gate line $GLIN_{n+1}$ adjacent to the gate line $GLIN_n$ changes from logic log L to logic high H and the gate line $GLIN_{n+1}$ is thus activated to turn on the second selection transistor SELT2. Thus, a variation in light sensed by the second sensing transistor SENT2 is supplied to the sensing line SLIN (P2=Sensing2).

In this case, as illustrated in FIG. 26, the node voltage $V_{nod}$ and the sensing current $I_{sen}$ vary depending on whether a touch event occurs. If the gate line $GLIN_n$ is activated, a physical touch as illustrated in FIG. 21B is sensed, the node voltage $V_{nod}$ has a voltage corresponding to the logic high H, the gate line $GLIN_{n+1}$ is activated, and an optical touch as illustrated in FIG. 14B is sensed, then the sensing current $I_{sen}$ is maintained at logic high H.

When the gate line $GLIN_{n+1}$ is deactivated and the gate line $GLIN_{n+2}$ adjacent to the gate line $GLIN_{n+1}$ is activated, a first reset transistor REST1 of the first sub sensing unit SENU1' and a second reset transistor REST2 of the second sub sensing unit SENU2' are turned on to simultaneously perform the reset operation described above on the node voltage $V_{nod}$ and the second sensing transistor SENT2 (P3=Reset1&Reset2).

FIG. 27 is a graph showing a sensing operation of the touch panel TP of FIG. 20 according to another example embodiment. Referring to FIGS. 20 and 27, the first sub sensing unit SENU1' of the touch panel TP' supplies sensing current $I_{sen}$ corresponding to a variation $\Delta V$ in a gate-source voltage $V_{GS}$ of the first sensing transistor SENT1 that changes from a first voltage V1 to a second voltage V2 due to physical touch on the touch panel TP', to the sensing line SLIN. In this case, a node voltage $V_{nod}$ (first voltage V1) when the first sensing transistor SENT1 is not gated may be a negative (−) voltage, and a node voltage $V_{nod}$ (second voltage V2) when a voltage of the first sensing transistor SENT1 is increased due to the physical touch and the first sensing transistor SENT1 is thus gated may be a positive (+) voltage. After the first sensing transistor SENT1 senses the physical touch, the reset operation described above is performed to set a gate voltage (node voltage $V_{nod}$) of the second sensing transistor SENT2 to be the first voltage V1 that is a negative (−) voltage.

The touch panel TP senses an optical touch together with the physical touch. The second sub sensing unit SENU2 of FIG. 27 supplies sensing current $I_{sen}$ corresponding to a variation $\Delta I$ in drain-source current $I_{DS}$ of the second sensing transistor SENT2 that changes from first current I1 to second current I2 due to the optical touch, to the sensing line SLIN.

Figure 28:
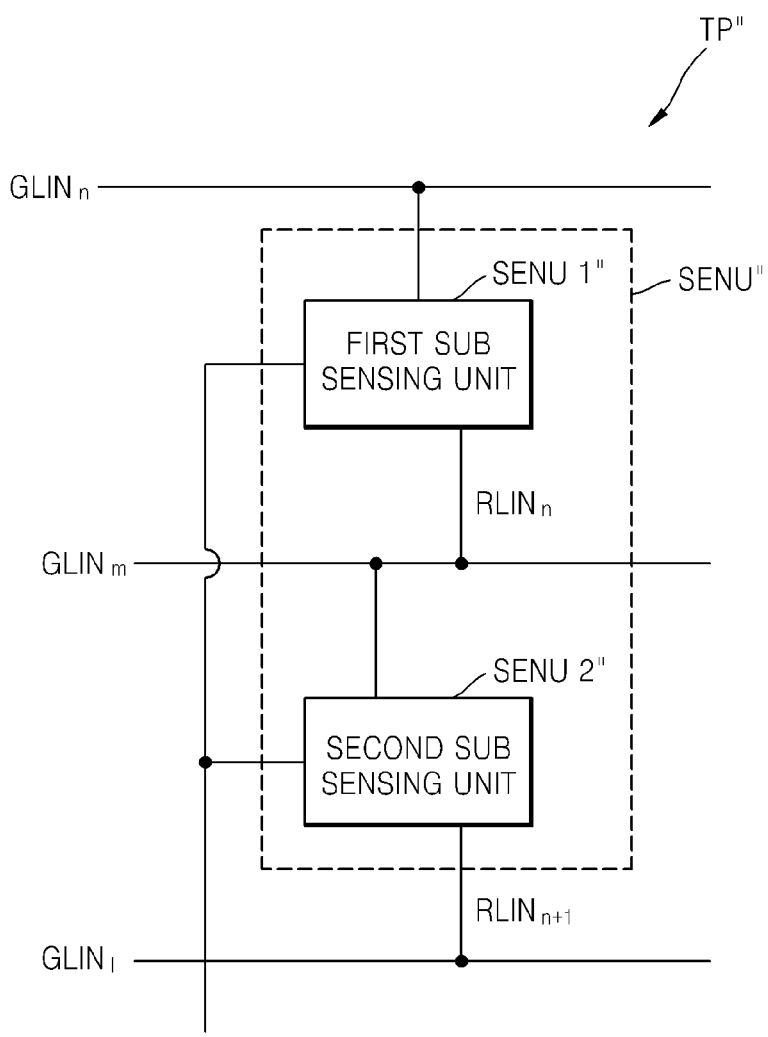
FIG. 28 is a circuit diagram of another example of the touch panel having a sensing unit different from that of FIG. 1.
Figure 29:
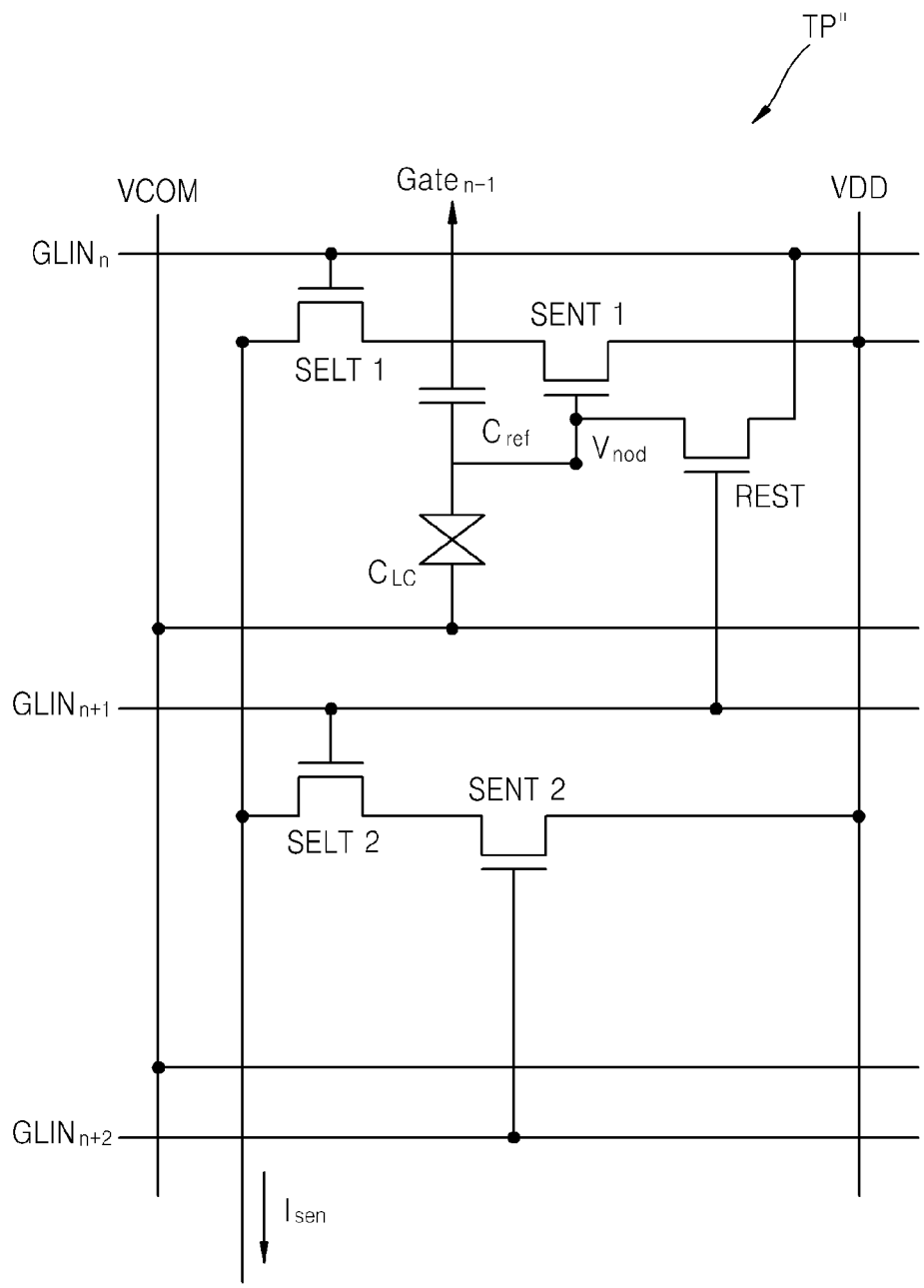
FIGS. 29 and 30 illustrate a structure and operation of the touch panel of FIG. 28, according to another example embodiment.
Figure 30:
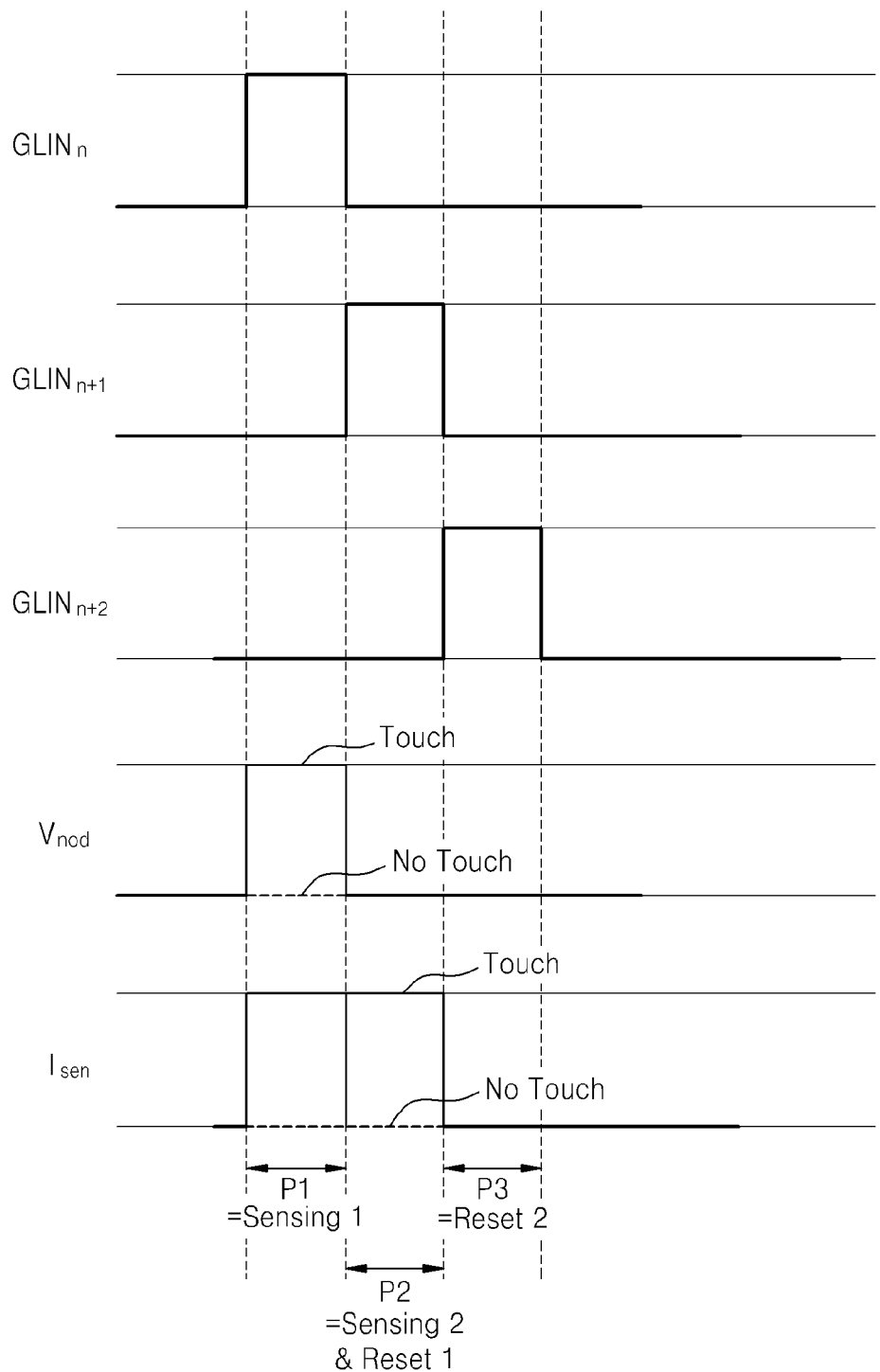

FIG. 28 is a circuit diagram of another example of a touch panel TP'' of FIG. 1 having a different sensing unit SENU''. While not shown in FIG. 28, the TP'' includes the gate driver 100. FIGS. 29 and 30 illustrate a structure and operation of the touch panel TP'' of FIG. 28, according to another example embodiment. Referring to FIGS. 28 to 30, the touch panel TP'' may include a first sub sensing unit SENU1'' and a second sub sensing unit SENU2'' that sense different objects at different times, in response to activation of different gate lines, similar to the touch panel TP of FIG. 20. However, in the touch panel TP" illustrated in FIGS. 28 and 29, a first reset line $RLIN_n$ of the first sub sensing unit SENU1" and a second reset line $RLIN_{n+1}$ of the second sub sensing unit SENU2" are different from each other. For example, the first sub sensing unit SENU1" that outputs sensing current $I_{sen}$ when a gate line $GLIN_n$ is activated is reset by a voltage applied to the first reset line $RLIN_n$ connected to a gate line $GLIN_m$. The second sub sensing unit SENU2 that outputs the sensing current $I_{sen}$ when the gate line $GLIN_m$ is activated is reset by a voltage applied to the second reset line $RLIN_{n+1}$ connected to a gate line $GLIN_l$.

The gate lines $GLIN_n$ and $GLIN_m$ of FIGS. 28 to 30 may be the same as the first gate line GLIN1 and the third gate line GLIN3 of FIG. 1. The gate lines $GLIN_m$ and $GLIN_l$ of FIGS. 28 to 30 may be the same as the second gate line GLIN2 and the fourth gate line GLIN4 of FIG. 1. In other words, the gate line $GLIN_m$ illustrated in FIGS. 28 to 30 may function as both a sensor gate line and a display gate line. This is because as illustrated in FIG. 31, the sensing unit SENU is connected to a gate line to which a display unit DPU is connected in the touch panel TP of FIG. 28, similar to the touch panel TP of FIG. 20.

Referring to FIGS. 28 to 30, a variation (node voltage $V_{nod}$) in a cell capacitance $C_{LC}$ is sensed when the gate line $GLIN_n$ is activated (P1=Sensing1), and not only a variation in the intensity of light is sensed but also a first reset transistor REST1 of the first sub sensing unit SENU1 is reset when a gate line $GLIN_{n+1}$ is activated (P2=Sensing2&Reset1). When a gate line $GLIN_{n+2}$ is activated, a second sensing transistor SENT2 of the second sub sensing unit SENU2 is reset (P3=Reset2).

Figure 31:
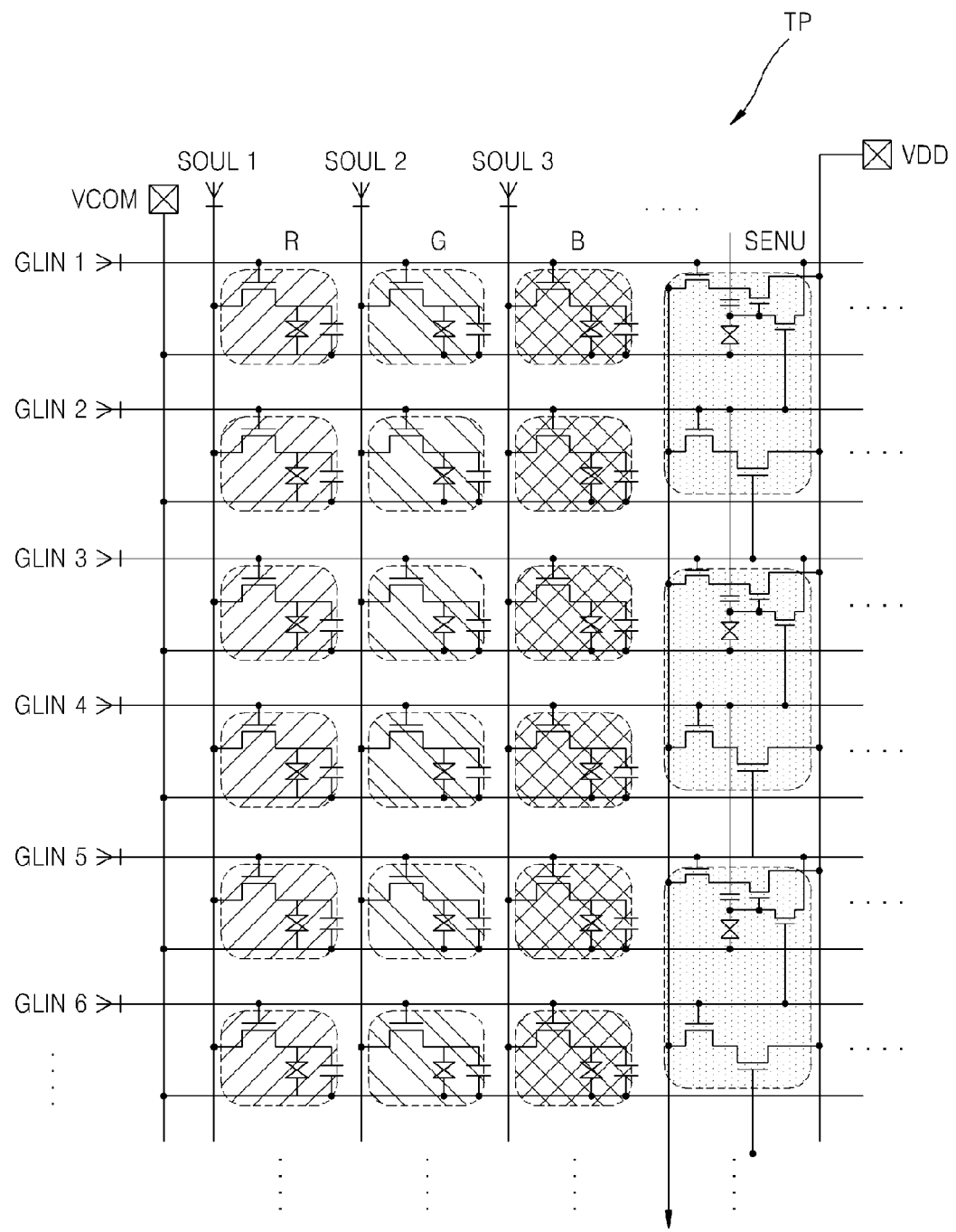
FIG. 31 is a circuit diagram of another example of the touch panel of FIG. 1.

FIG. 31 is a circuit diagram of another example of the touch panel TP of FIG. 1. Referring to FIG. 31, in the touch panel TP, a sensing unit SENU is embodied together with display pixels as described above (in-cell type). FIG. 31 illustrates a case where each of gate lines is connected to display pixels, e.g., R, G, and B display pixels, and the sensing unit SENU. Thus, the touch panel TP may not be installed separately from a display panel (not shown). The touch panel TP according to the current embodiment may be easily embodied as an in-cell type by realizing a simple circuit capable of sensing different types of touches as described above.

Figure 32:
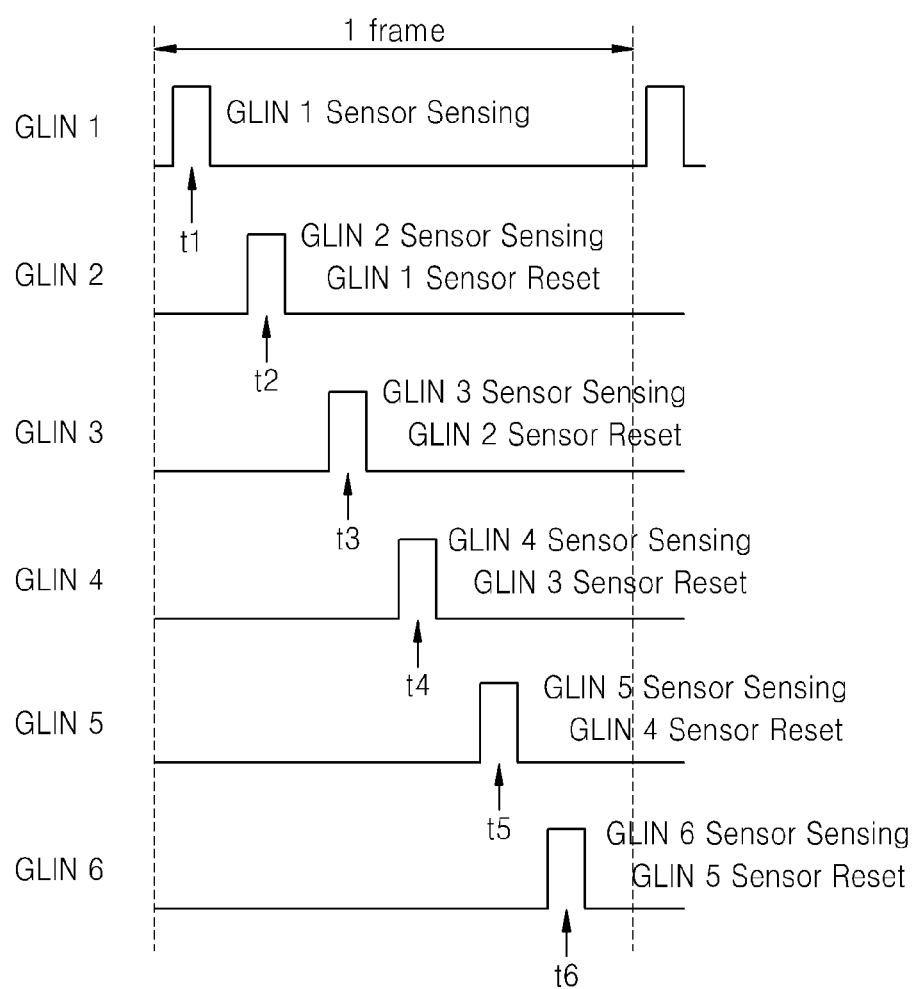
FIG. 32 is a timing diagram illustrating an operation of the touch panel of FIG. 31 according to another example embodiment.

FIG. 32 is a timing diagram illustrating an operation of the touch panel TP of FIG. 31 according to another example embodiment. Referring to FIGS. 31 and 32, first to sixth gate lines GLIN1 to GLIN6 of the touch panel TP of FIG. 31 are respectively, sequentially activated points of time t1 to t6 to perform sensing and/or reset operations corresponding thereto as illustrated in FIG. 32. For example, a sensing unit SENU connected to the first gate line GLIN1 may be sensed when the first gate line GLIN1 is activated, and a sensing unit SENU connected to the second gate line GLIN2 may be sensed and the sensing unit SENU connected to the first gate line GLIN1 may be reset when the second gate line GLIN2 is activated. Similarly, a sensing unit SENU of the third gate line GLIN3 may be reset and the sensing unit SENU of the second gate line GLIN2 may be reset when the third gate line GLIN3 is activated.

Figure 33:
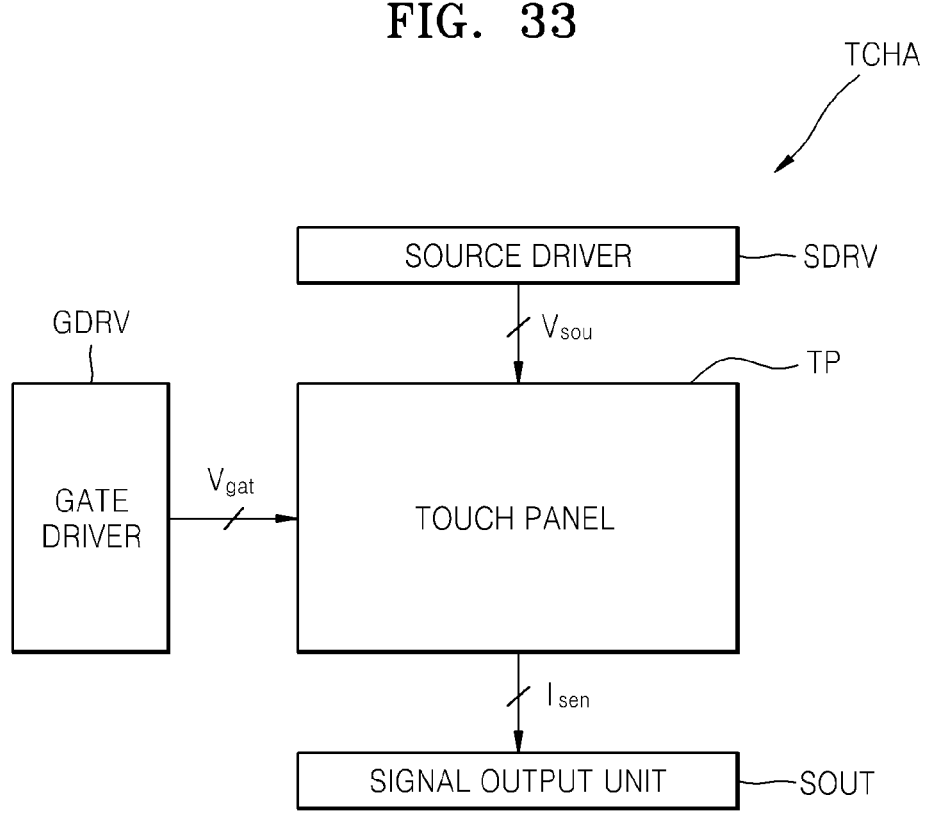
FIG. 33 is a block diagram of a touch screen apparatus according to an example embodiment.

FIG. 33 is a block diagram of a touch screen apparatus THCA according to an example embodiment. Referring to FIG. 33, the touch screen apparatus THCA may include a gate driver GDRV and a source driver SDRV that apply a gate voltage Vgat and a source voltage Vsou to a touch panel TP, such as that according to one of the above embodiments, respectively, and a signal output unit SOUT that receives sensing current $I_{sen}$ sensed by the touch panel TP and outputs a signal (data) corresponding to the sensing current $I_{sen}$.

The structures and operations of touch panel according to various example embodiments have been described above, but may be embodied in many different forms and should not be construed as being limited to the embodiments set forth herein.

Figure 34:
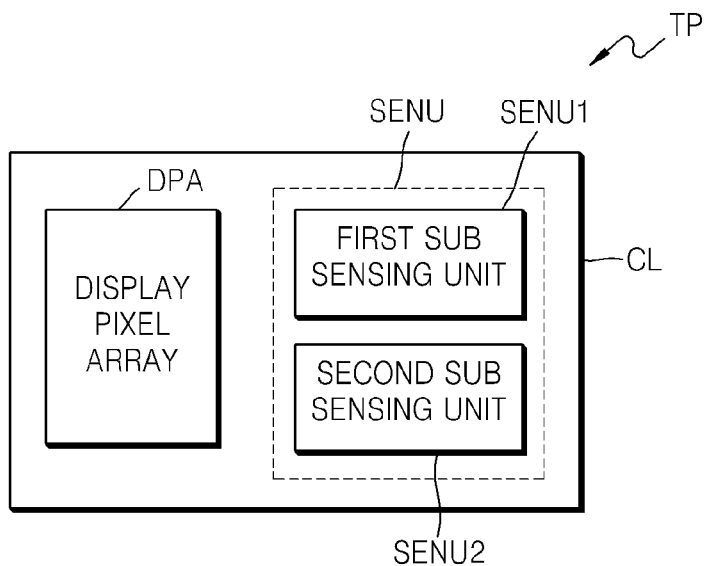
FIG. 34 is a block diagram of a touch panel according to another example embodiment.

For example, FIG. 1 illustrates the gate lines connected to the first sub sensing unit SENU1 and the second sub sensing unit SENU2 but example embodiments are not limited thereto. As illustrated in FIG. 34, a touch panel TP may include a display pixel array DPA and a sensing unit SENU on the same layer CL. The first sub sensing unit SENU1 and the second sub sensing unit SENU2 that are included in the sensing circuit SENU and sense different types of touch variations, may individually perform a sensing operation regardless of a connection among the first and second sensing units SENU1 and SENU2 and gate lines. In FIG. 34, the layer CL may be the same as the layer CL illustrated in FIG. 2A. The number of the first sub sensing units SENU1 may be equal to the number of the second sub sensing units SENU2 or greater than or less than the number of the second sub sensing units SENU2. Accordingly, example embodiments set forth herein should be considered in descriptive sense only and not for purposes of limitation.

As described above, a hybrid touch panel capable of performing optical sensing and capacitance sensing, a hybrid touch screen apparatus, and a method of driving the hybrid touch screen according to the one or more of the above embodiments of the example embodiments are capable of efficiently sensing touch at a long distance and a short distance.

Furthermore, a touch panel may be embodied as an in-cell touch screen capable of performing different types of sensing operations by embodying a sensing unit capable of performing different types of sensing operations as a simple circuit.

Also, it is possible to more efficiently remove limitations to increasing the size of the touch panel due to a parasitic capacitance and prevent a delay in a sensing operation by performing optical sensing by using an oxide photo sensor transistor.

It should be understood that the example embodiments described therein should be considered in a descriptive sense only and not for purposes of limitation. Descriptions of features or aspects within each embodiment should typically be considered as available for other similar features or aspects in other example embodiments.

What is claimed is:
1. A touch panel comprising:
a sensing unit including,
a first sub sensing unit configured to output a first sensing current in response to a voltage of a first gate line and configured to reset in response to a voltage of a second gate line, the first sensing current corresponding to a first touch type, the first and second gate lines being different, and
a second sub sensing unit configured to output a second sensing current in response to a voltage of a third gate line and configured to reset in response to a voltage of a fourth gate line, the second sensing current corresponding to a second touch type which is different than the first touch type, the third and fourth gate lines being different; and
a display unit configured to generate an image voltage corresponding to image data to be displayed, in response to at least one of the voltages of the first to fourth gate lines.

2. The touch panel of claim 1, further comprising:
first and second electrodes, the first electrode being a pixel electrode configured to receive the image voltage, the second electrode being a common electrode configured to receive a common voltage.

3. The touch panel of claim 2, wherein the first sub sensing unit and the display unit are coupled to the second electrode.

4. The touch panel of claim 2, wherein the first sub sensing unit includes an oxide transistor configured to output the first sensing current corresponding to a voltage change at the second electrode.

5. The touch panel of claim 1, wherein the second sub sensing unit includes an oxide transistor configured to output the second sensing current in response to the voltage of the third gate line.

6. The touch panel of claim 1, wherein the display unit and the first sub sensing unit are in the same array.

7. The touch panel of claim 1, wherein the first touch type indicates whether the touch panel is physically touched.

8. The touch panel of claim 7, wherein the second touch type denotes a variation in current corresponding to a touch of light incident on the touch panel.

9. The touch panel of claim 1, wherein the first to fourth gate lines are different gate lines.

10. A touch screen apparatus, comprising:
a touch panel including,
a first sub sensing unit configured to output a first sensing current, and
a second sub sensing unit configured to output a second sensing current,
wherein the first sensing current corresponds to a first touch type,
wherein the second sensing current corresponds to a second touch type,
wherein the second touch type is different than the first touch type, and
wherein the second sub sensing unit includes an oxide transistor configured to output the second sensing current.

11. The touch screen apparatus of claim 10, wherein the touch panel further includes:
first and second electrodes, the first electrode being a pixel electrode configured to receive an image voltage, the second electrode being a common electrode configured to receive a common voltage; and
a display unit configured to generate the image voltage corresponding to image data to be displayed, the first sub sensing unit and the display unit being coupled to the second electrode.

12. The touch screen apparatus of claim 11, wherein the first sub sensing unit includes an oxide transistor configured to output the first sensing current corresponding to a voltage change at the second electrode.

13. The touch screen apparatus of claim 11, wherein
the first sub sensing unit is configured to output the first sensing current in response to a voltage of a first gate line and configured to reset in response to a voltage of a second gate line,
the second sub sensing unit is configured to output the second sensing current in response to a voltage of a third gate line and configured to reset in response to a voltage of a fourth gate line, and
the display unit is configured to generate the image voltage in response to at least one of the voltages of the first to fourth gate lines.

14. The touch screen apparatus claim 13, wherein the first to fourth gate lines are different gate lines.

15. The touch screen apparatus of claim 11, wherein the display unit and the first sub sensing unit are in the same array.

16. The touch screen apparatus of claim 10, wherein the first touch type indicates whether the touch panel is physically touched.

17. The touch screen apparatus of claim 16, wherein the second touch type denotes a variation in current corresponding to a touch of light incident on the touch panel.

18. A method of controlling a touch panel, the method comprising:
controlling first and second sensing units such that one of the first and second sensing units is active,
wherein the first sensing unit is configured to sense a first touch type of the touch panel,
wherein the second sensing unit is configured to sense a second touch type of the touch panel, and
wherein the first touch type is different than the second touch type.

19. The method of claim 18, wherein the first touch type is a physical touch.

20. The method of claim 19, wherein the second touch type is light incident on the touch panel.

21. The method of claim 18, wherein the controlling includes,
first resetting the first sensing unit;
activating a first display unit of the touch panel during the first resetting; and
activating the second sensing unit after resetting the first sensing unit.

22. The method of claim 21, wherein the controlling includes,
second resetting the second sensing unit; and
activating a second display unit during the second resetting.

23. The method of claim 18, wherein the controlling includes, activating the first sensing unit;
resetting the first sensing unit; and
activating the second sensing unit during the resetting.

24. The method of claim 18, wherein the controlling includes,
first providing a first gate voltage on a first gate line;
activating the first sensing unit based on the first providing;
second providing a second gate voltage on a second gate line; and
deactivating the first sensing unit based on the second providing, the first gate line and the second gate line being different.

25. The method of claim 24, wherein the controlling includes,
third providing a third gate voltage on a third gate line;
activating the second sensing unit based on the third providing;
fourth providing a fourth gate voltage on a fourth gate line; and
deactivating the second sensing unit based on the fourth providing, the third gate line and the fourth gate line being different.

* * * * *